United States Patent
Cao

(10) Patent No.: US 6,525,848 B2
(45) Date of Patent: Feb. 25, 2003

(54) SWITCHABLE INTERLEAVED OPTICAL CHANNEL SEPARATOR AND ISOLATOR DEVICE AND OPTICAL SYSTEMS UTILIZING SAME

(75) Inventor: Simon Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 161 days.

(21) Appl. No.: 09/792,231

(22) Filed: Feb. 23, 2001

(65) Prior Publication Data

US 2002/0118434 A1 Aug. 29, 2002

(51) Int. Cl.[7] .............. G02F 3/00; H04J 14/00; G02B 27/28
(52) U.S. Cl. .............. 359/107; 359/115; 359/117; 359/122; 359/484; 359/497
(58) Field of Search .............. 359/107, 108, 359/115, 117, 122, 484, 494–499

(56) References Cited

U.S. PATENT DOCUMENTS

| | | | |
|---|---|---|---|
| 6,396,629 B1 * | 5/2002 | Cao | 359/122 |
| 6,453,089 B1 * | 9/2002 | Cao | 359/131 |
| 2001/0053022 A1 * | 12/2001 | Tai et al. | 359/484 |
| 2002/0015228 A1 * | 2/2002 | Cao et al. | 359/497 |
| 2002/0024730 A1 * | 2/2002 | Ducellier et al. | 359/498 |
| 2002/0027711 A1 * | 3/2002 | Tai et al. | 359/497 |
| 2002/0076144 A1 * | 6/2002 | Tai et al. | 385/24 |

* cited by examiner

*Primary Examiner*—Evelyn A Lester
(74) *Attorney, Agent, or Firm*—Sawyer Law Group LLP

(57) ABSTRACT

The present invention provides an improved switchable interleaved channel separator device. The switchable interleaved channel separator device utilizes a reflective interferometer and one single-segment switchable polarization rotator. The reflective interferometer causes signal light paths to be reflected back upon one another so as to realize an overall reduction in size. This path reflection also enables the capability of providing optical couplings predominantly or wholly at a single side or at adjacent sides of the device.

15 Claims, 20 Drawing Sheets

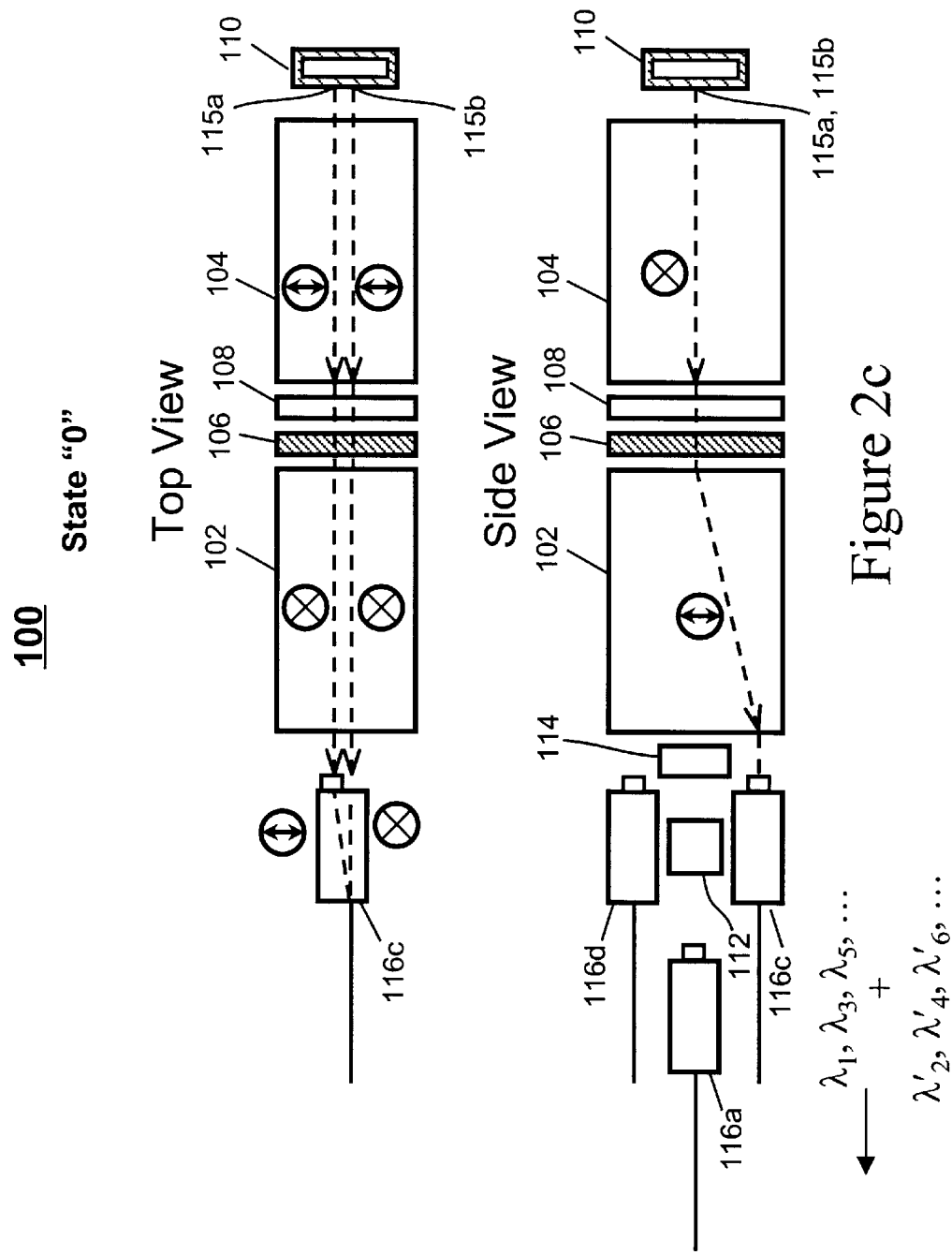

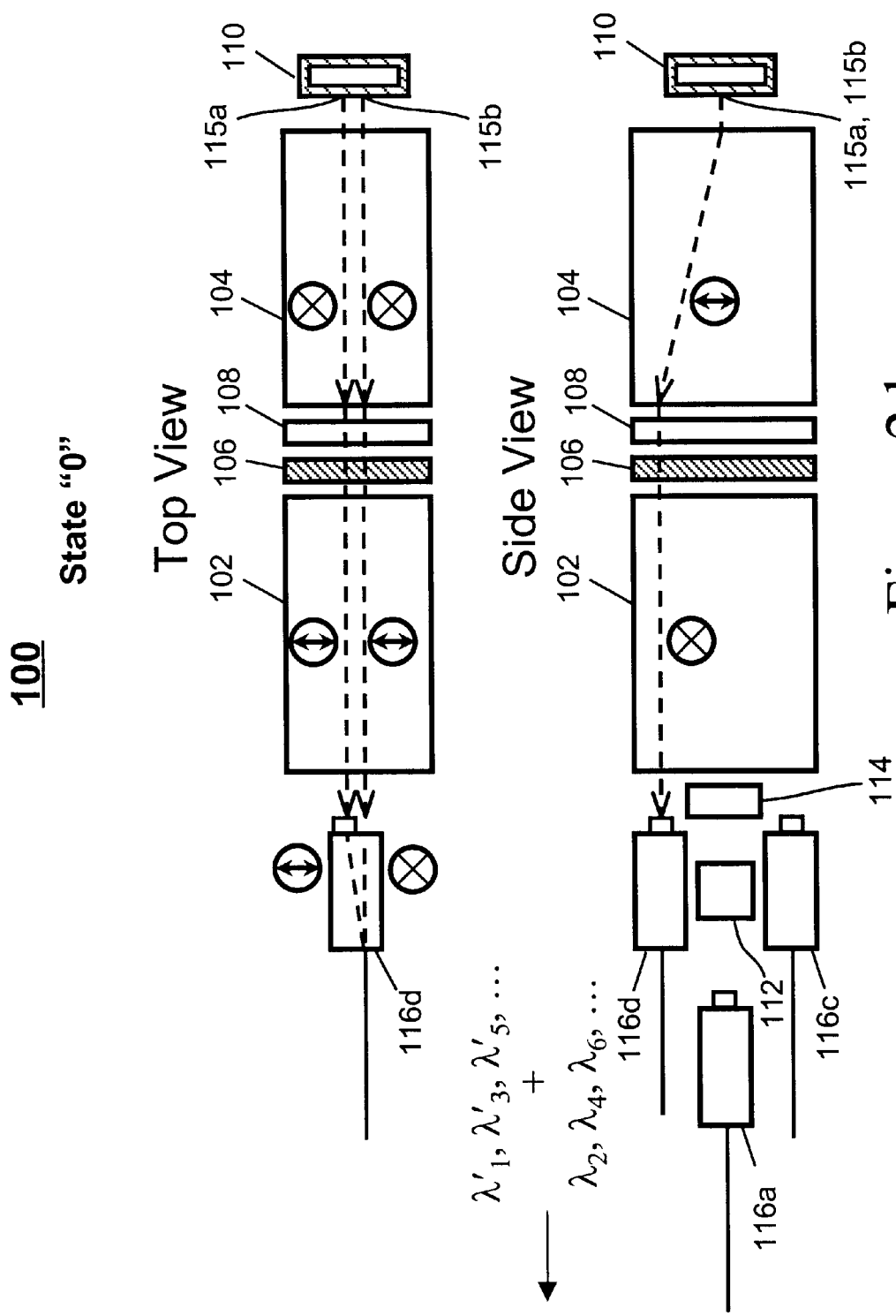

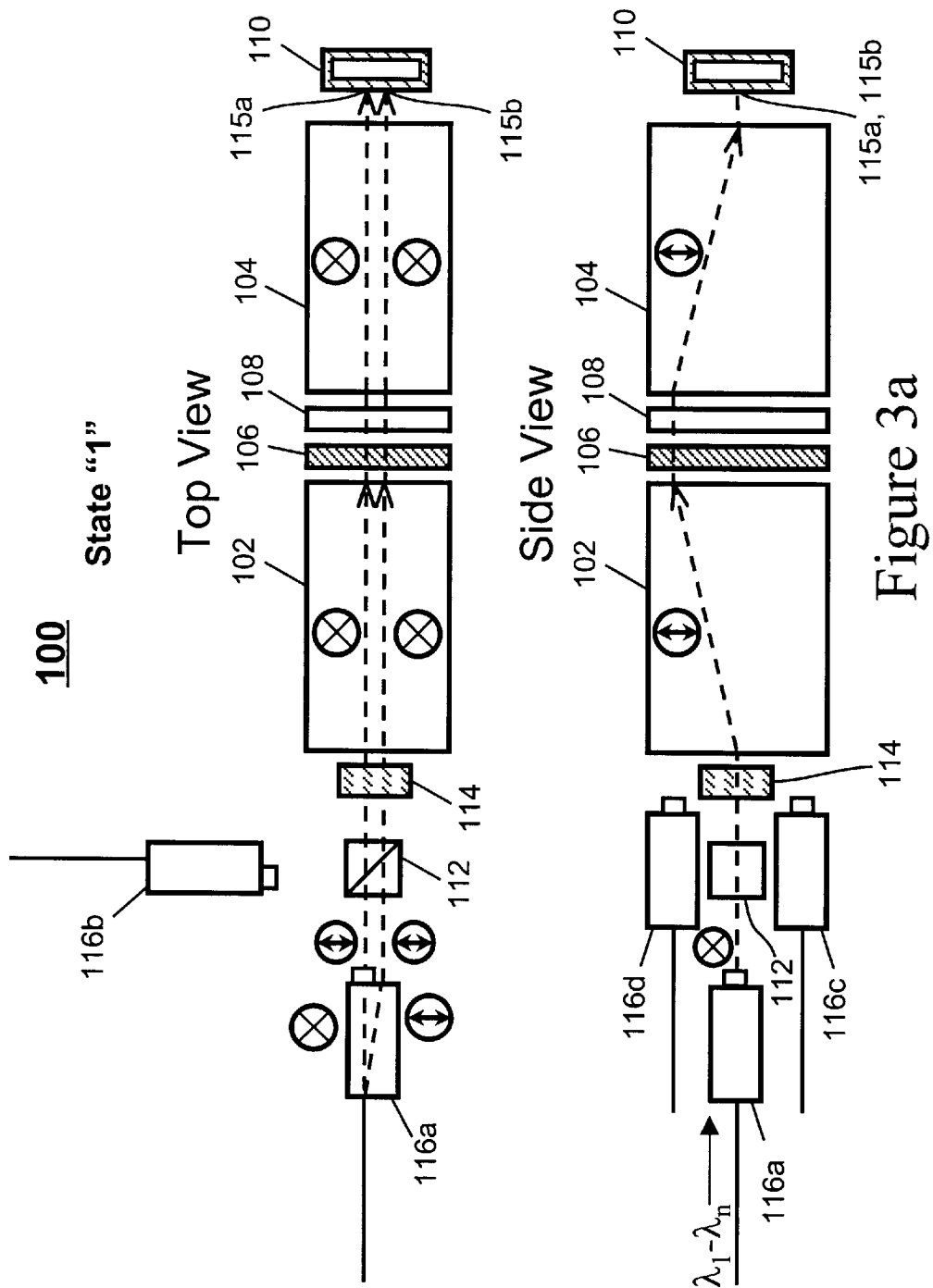

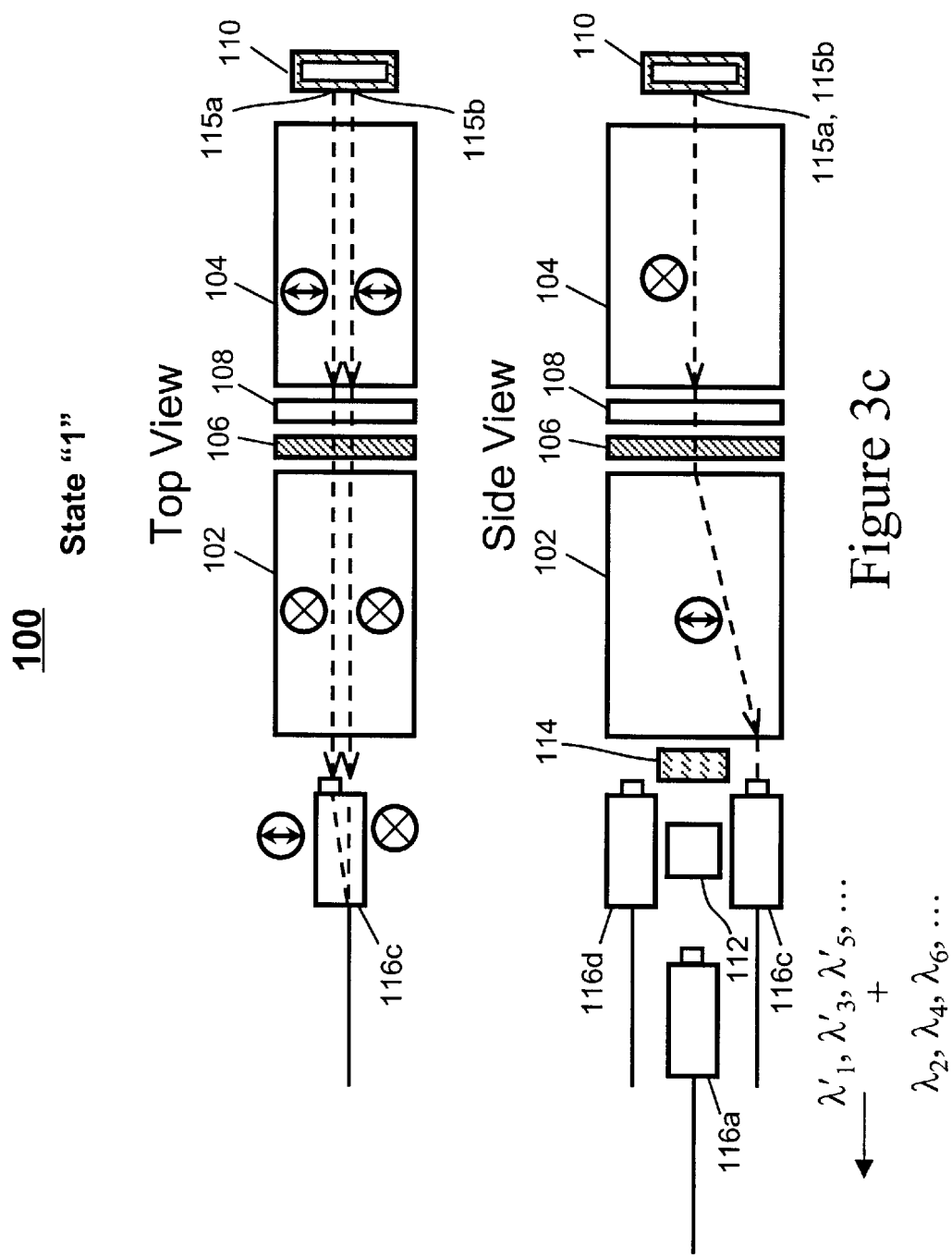

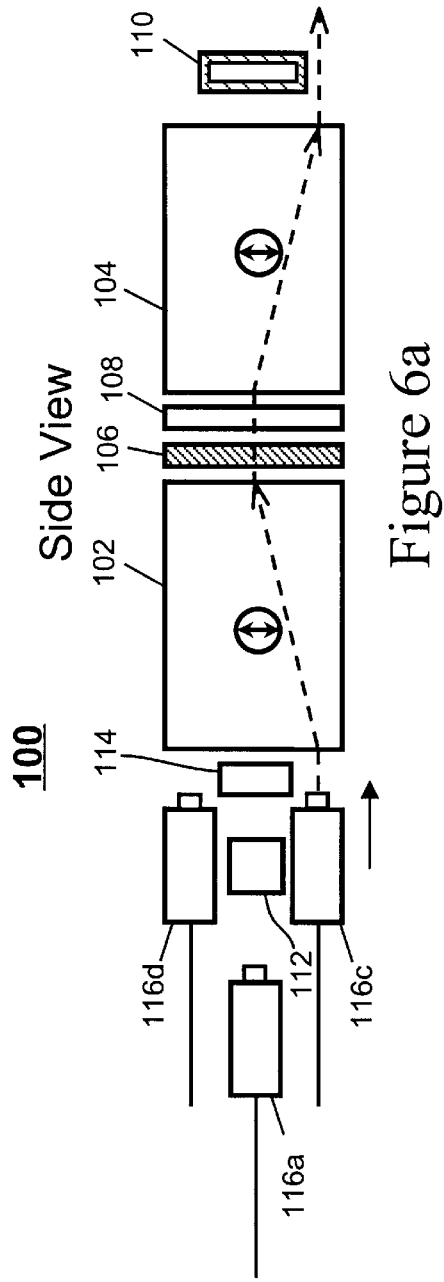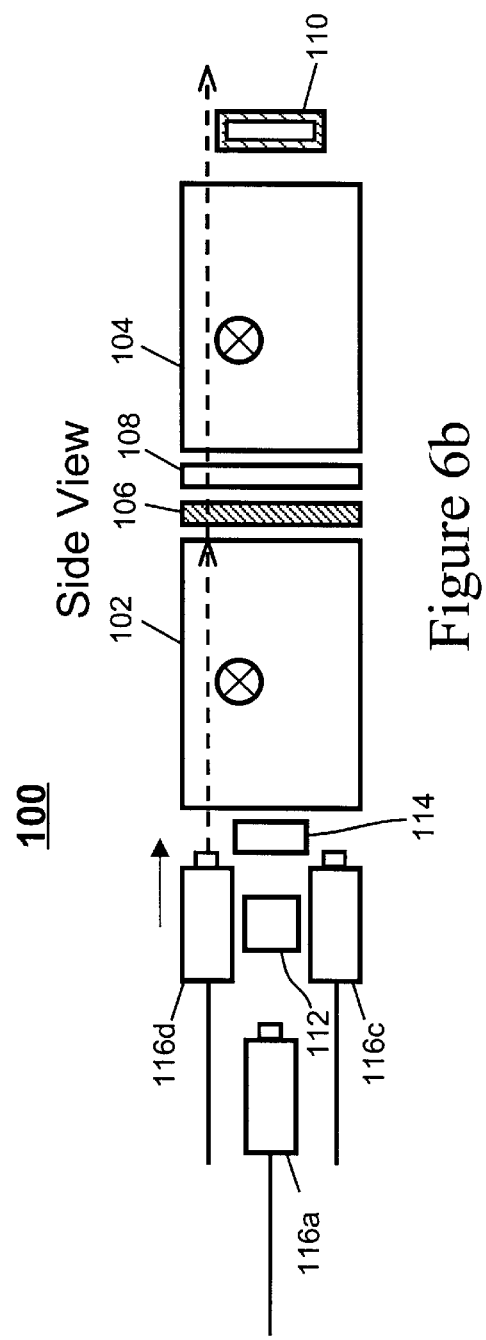

SWITCHABLE INTERLEAVED OPTICAL CHANNEL SEPARATOR AND ISOLATOR DEVICE AND OPTICAL SYSTEMS UTILIZING SAME

FIELD OF THE INVENTION

The present invention relates to optical communications networks, and more particularly to optical switching, routing, multiplexing and de-multiplexing devices.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carry capacity of existing fiber cable is Wavelength Division Multiplexing (WDM) in which multiple information channels are independently transmitted over the same fiber using multiple wavelengths of light. In this practice, each lightwave-propagated information channel corresponds to light within a specific wavelength range or "band."

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

Because of the increased network traffic resulting from the use of the WDM technique, there is an increasing need for sophisticated optical switching and routing devices which can quickly route or re-route numerous channels amongst various optical communications lines. FIG. 1 illustrates a known apparatus that performs this function. This apparatus 300 has two control states and serves to separate channels of the wavelength spectrum applied to an input port 11 and determines which of two output ports 13, 14 are coupled to each of the channels. The input WDM signal enters the first birefringent element 30 that spatially separates horizontal and vertically polarized components of the WDM signal. The first birefringent element 30 allows the vertically polarized portion of the optical signal to pass through without changing course. In contrast, horizontally polarized waves are redirected at an angle because of the birefringent walk-off effect. The horizontally polarized component travels along a path 301 as an extraordinary signal in the first birefringent element 30 while the vertically polarized component 302 travels as an ordinary signal and passes through without spatial reorientation.

Both the horizontally and vertically polarized components 301 and 302 are coupled to a switchable polarization rotator 40 under control of a control bit. The polarization rotator 40 consists of two sub-element rotators that form a complementary state, i.e. when one turns on the other turns off, such that, in general, the rotator 40 rotates the signals by either 0° (i.e., no rotation) or 90°. FIG. 1 illustrates one control state in which the signal 302 is rotated by 90° so that both signals 303, 304 exiting the rotator 40 have a horizontal polarization.

The stacked waveplates element 61 is a stacked plurality of birefringent waveplates at selected orientations that generate two eigen states. The first eigen state carries a first sub-spectrum with the same polarization as the input, and the second eigen state carries a complementary sub-spectrum at the orthogonal polarization. With horizontal polarizations 303, 304 input to the stacked waveplates element 61 as shown in FIG. 1, orthogonal vertical and horizontal polarizations are generated with the first spectral band residing in horizontal polarization and the second spectral band residing in vertical polarization. With vertical polarizations 303, 304 input to the stacked waveplates element 61 (not shown) orthogonal vertical and horizontal polarizations are generated with the first spectral band residing in vertical polarization and the second spectral band residing in horizontal polarization.

The pairs of optical responses 305, 306 output by the stacked waveplates element 61 are coupled to a second birefringent element 50. This birefringent element 50 has a similar construction to the first birefringent element 30 and spatially separates the horizontally and vertically polarized components of the input optical signals 305 and 306. As shown in FIG. 1, the optical signals 305, 306 are broken into vertically polarized components 307, 308 containing the second spectral band and horizontally polarized components 309, 310 containing the first spectral band. Due to the birefringent walk-off effect, the two orthogonal polarizations that carry first spectral band 309, 310 in horizontal polarization and second spectral band 307, 308 in vertical polarization are separated by the second birefringent element 50.

Following the second birefringent element 50, the optical elements on the input side of the second birefringent element 50 can be repeated in opposite order, as illustrated in FIG. 1. The second stacked waveplates element 62 has substantially the same composition as the first stacked waveplates element 61. The horizontally polarized beams 309, 310 input to the second stacked waveplates element 62, are further purified and maintain their polarization when they exit the second stacked waveplates element 62. On the other hand, the vertically polarized beams 307, 308 experience a 90° polarization rotation and are also purified when they exit the second stacked waveplates element 62. The 90° polarization rotation is due to the fact that the vertically polarized beams 307, 308 carry the second spectral band and therefore are in the complementary state of element 62. At the output of the stacked waveplates element 62, all four beams 311, 312 and 313, 314 have horizontal polarization.

To recombine the spectra of the two sets of beams 311, 312 and 313, 314, a second polarization rotator 41 and a second birefringent element 70 are used. The second rotator 41 has two sub-elements that intercept the four parallel beams 311–314. The two sub-elements of the second rotator 41 are set at a complementary state to the first rotator 40. In the state illustrated in FIG. 1, the polarization of beams 311 and 313 is rotated by 90°, and beams 312 and 314 are passed without change of polarization. This results in an orthogonal polarization pair 315, 316 and 317, 318 for each spectral band at the output of the second rotator 41. Finally, a second birefringent element 70 re-combines the two orthogonal polarizations 315, 316 and 317, 318 using the walk-off effect to produce two spectra that exit at ports 14 and 13, respectively. In the operational state shown in FIG. 1, the first and second spectral bands exit at ports 13 and 14, respectively. In the other operational state of the apparatus 300, the outputs of the two spectral bands are reversed.

Although the known apparatus 300 (FIG. 1) appears to be capable of performing its intended function, the structure of the apparatus 300 entails undesirable complexity since the two different multi-segment polarization rotators 40–41 working in tandem with one another are required perform the function of switching the operational state of the apparatus 300. Further, since all the various functions of the apparatus 300 are performed by transmissive optical elements, the input port 11 and output ports 13–14 must necessarily be disposed at opposite sides of the apparatus 300. Such a disposition causes the apparatus 300 to be excessively large and creates difficulty for coupling the apparatus 300 to fiber ferrules or ribbon cables in which all the fibers are disposed within a single bundle or group. Still further, the light paths through the apparatus 300 are completely reversible, right-to-left or left-to-right. Although this functioning is acceptable for many applications, it can allow an undesired situation inadvertently reflected backward propagating light exiting the apparatus 300 through the input port 11. Thus, the apparatus 300 does not provide an optical isolation function.

Accordingly, there exists a need for an improved switchable interleaved channel separator device. The improved device should perform the functions of switching by a single polarization rotator element to reduce size and complexity of the device. The wavelength sorting function of the device should be performed by a reflection element so as to facilitate external optical coupling to the device predominantly at a single side or at adjacent sides of the device. The device should provide an optical isolation function, wherein light entering the device from either of the output ports is prevented from exiting the device through either of the input ports. The present invention addresses such a need.

SUMMARY OF THE INVENTION

The present invention provides an improved switchable interleaved channel separator device. The switchable interleaved channel separator device utilizes a reflective interferometer and one single-segment switchable polarization rotator. The reflective interferometer causes signal light paths to be reflected back upon one another so as to realize an overall reduction in size. This path reflection also enables the capability of providing optical couplings predominantly or wholly at a single side or at adjacent sides of the device.

BRIEF DESCRIPTION OF THE FIGURES

FIGS. 2a–2d each illustrate a top view and a side view of a preferred embodiment of a switchable interleaved channel separator device in accordance with the present invention operated in a first switch state.

FIGS. 3a–3d each illustrate a top view and a side view of the preferred embodiment of the switchable interleaved channel separator device in accordance with the present invention operated in a second switch state.

FIGS. 6a–6b illustrate the pathways of inadvertently reflected signal light rays through the preferred embodiment of the switchable interleaved channel separator device in accordance with the present invention.

DETAILED DESCRIPTION

The present invention provides an improved switchable interleaved channel separator device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2a through 11 in conjunction with the discussion below.

Figure 1:
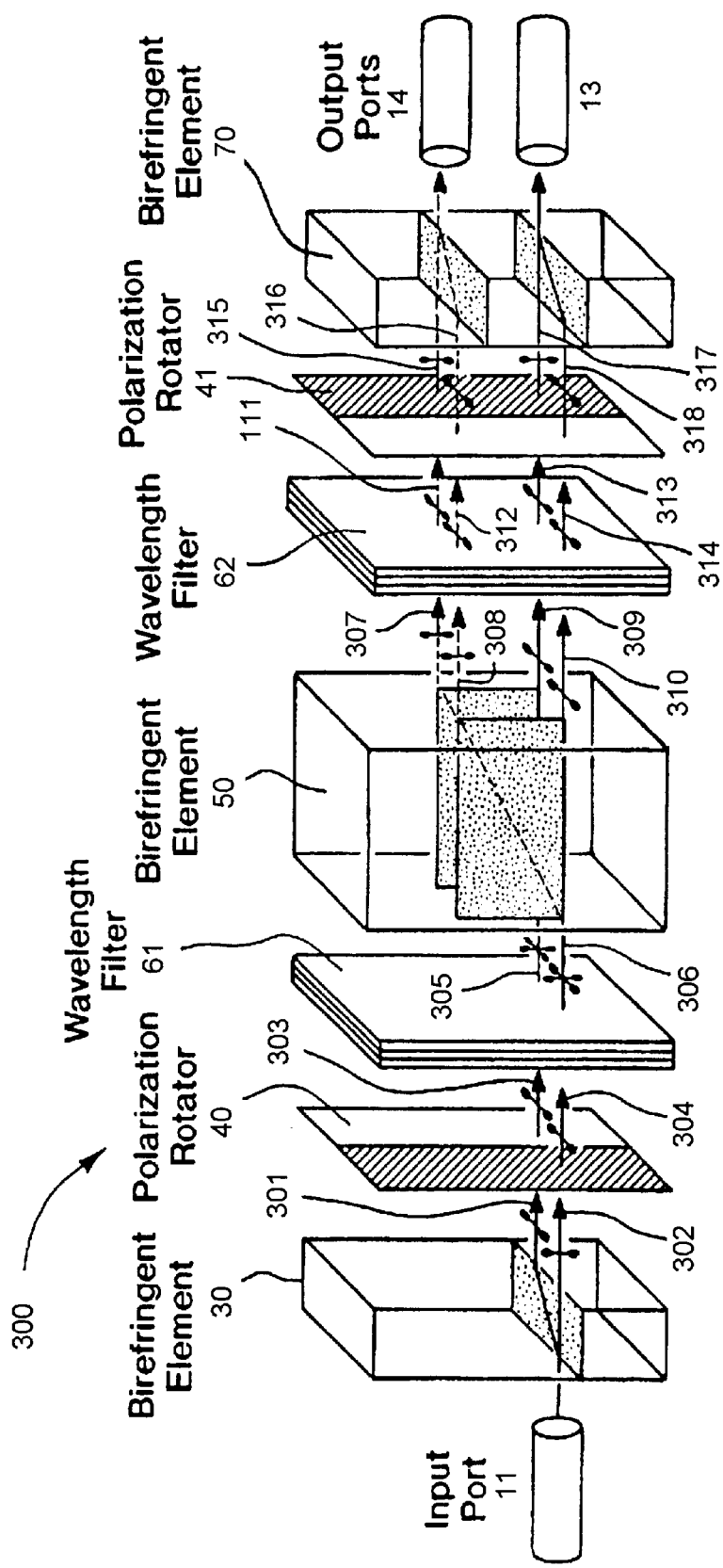
FIG. 1 is a diagram of a known switchable wavelength router.
Figure 2A:
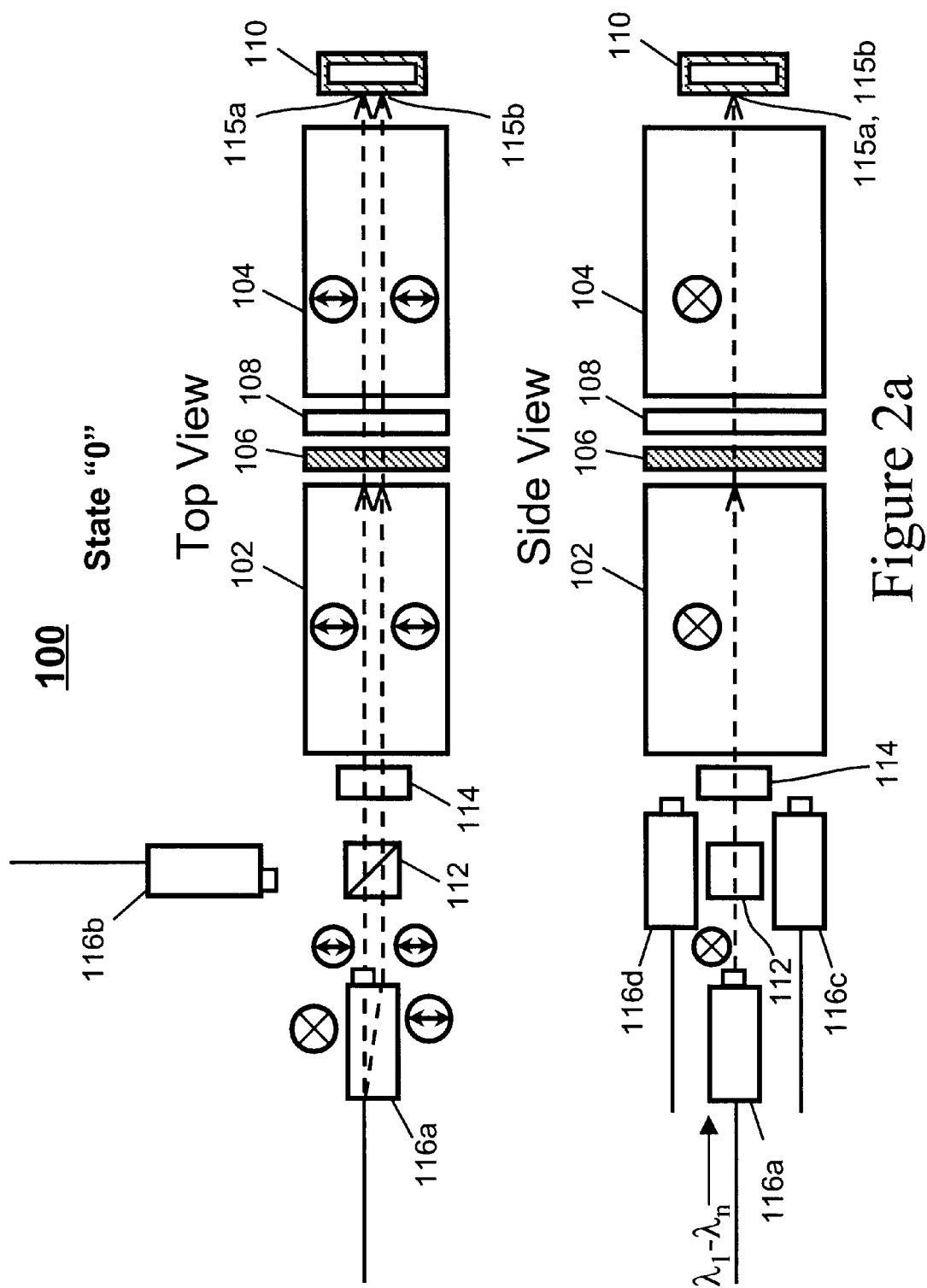
Figure 2B:
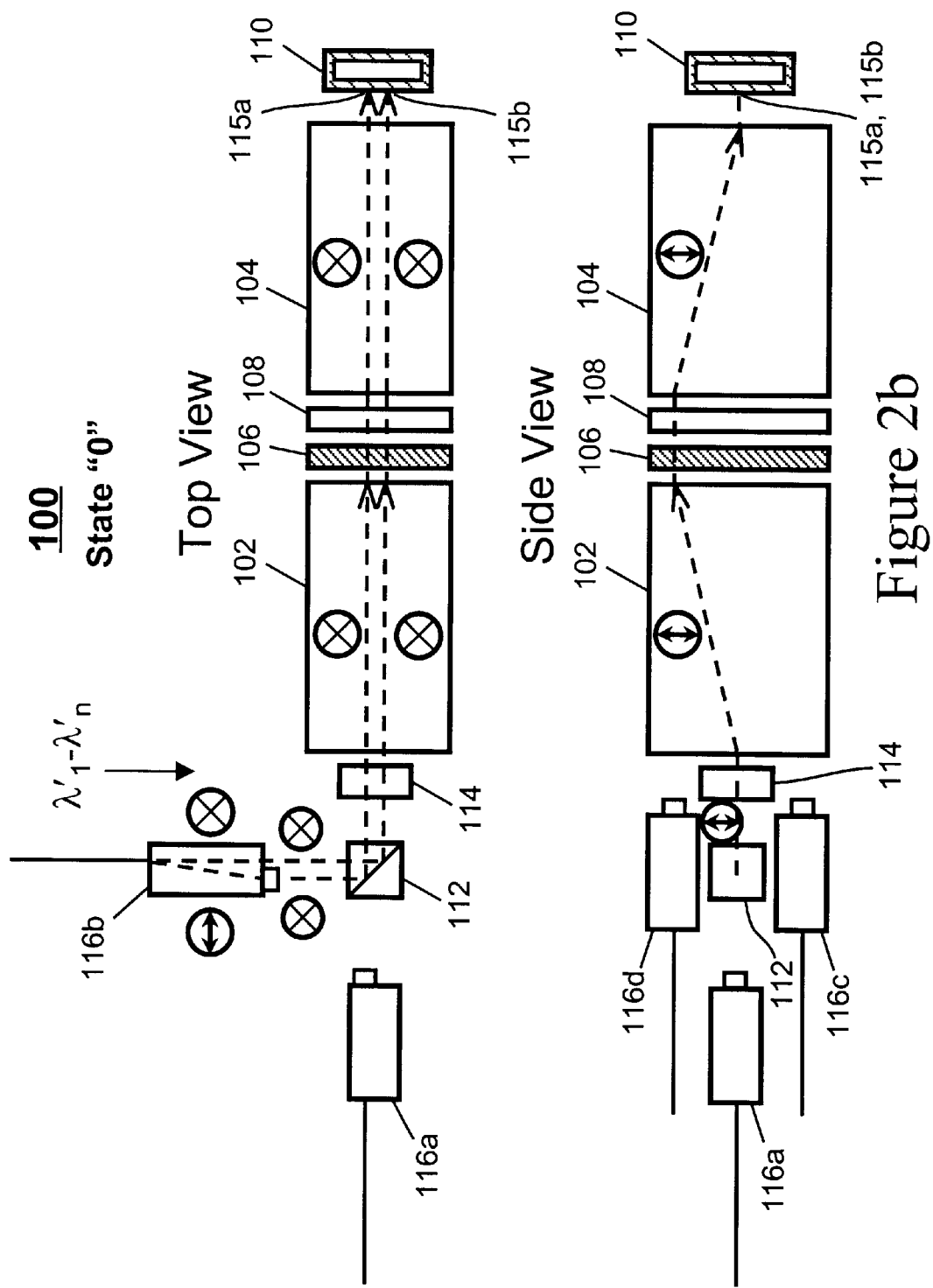
Figure 3B:
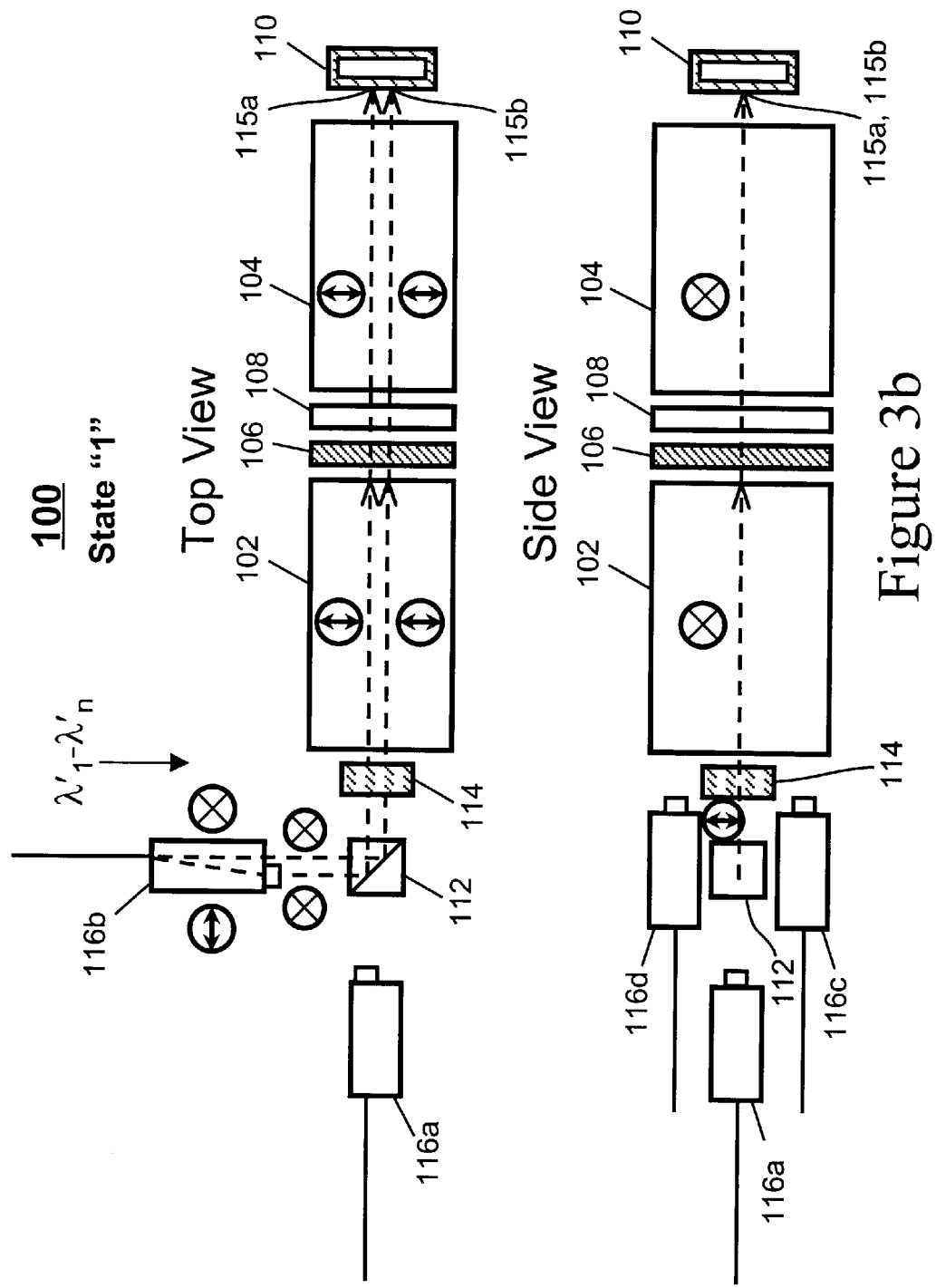
Figure 3D:
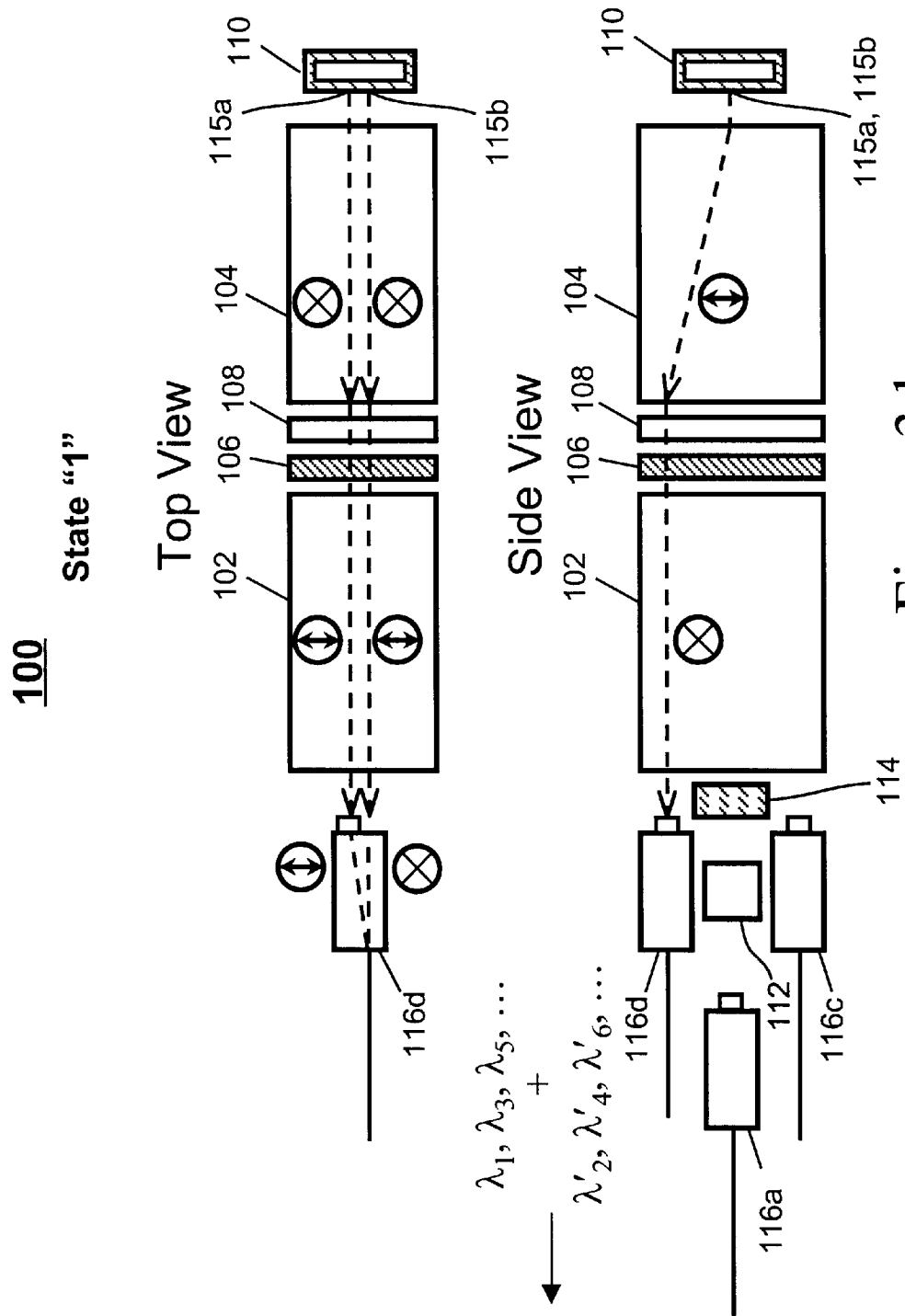

FIGS. 2a–2d and 3a–3d each illustrate a side view and a top view of a preferred embodiment of a switchable interleaved channel separator device in accordance with the present invention. FIGS. 2a–2d illustrate the operation of a 2×2 switchable interleaved channel separator device in its first switch state, state "0", and FIGS. 3a–3d illustrate the operation in a second complementary switch state, state "0". The switchable interleaved channel separator device 100, shown in FIGS. 2a–2d and 3a–3d, is a modified version of a device disclosed in a co-pending U.S. patent application entitled "Multi-Function Optical Device Utilizing Multiple Birefringent Plates and Non-Linear Interferometers," Ser. No. 09/645,232, filed on Aug. 24, 2000, now U.S. Pat. No. 6,396,629. Applicant incorporates this patent application herein by reference in its entirety. The 2×2 switchable interleaved channel separator device 100 receives first input from a first optical port 116a (FIGS. 2a, 3a) and a second input from a second optical port 116b (FIGS. 2b, 3b). The device 100 then separates the channels received from the first optical port 116a into a first set of channels and a second set of channels that are interleaved with the first set of channels, and separates the channels received from the second optical port 116b into a third set of channels and a fourth set of channels that are interleaved with the third set of channels. In the switch state "0", the first set of channels and the fourth set of channels are output to a first output optical port 116c (FIG. 2c) whilst the second set channels and the third set of channels are output to a second output optical port 116d (FIG. 2d). In the second switch state "1", the second set of channels and the third set of channels are output to the first output optical port 116c (FIG. 3c) whilst the first set channels and the fourth set of channels are output to the second output optical port 116d (FIG. 3d). This operation is shown schematically in FIG. 4.

As shown in FIGS. 2a–2b and 3a–3b, the switchable interleaved channel separator device 100 comprises four optical ports 116a–116d, a polarization beam splitter (PBS) 112 optically coupled to the two input ports 116a–116b, a switchable optical rotator 114 optically coupled to the PBS 112, a first 102 birefringent walk-off plate (or, simply termed, "birefringent plate") optically coupled to the two output ports 116c–116d and to the switchable optical rotator 114, a second birefringent plate 104, a non-reciprocal optical rotator 106 and a reciprocal optical rotator 108 disposed between and optically coupled to the first and second birefringent plates, and a non-linear interferometer 110 optically coupled to the second birefringent plate 104. The first birefringent plate 102 receives optical input from the first input port 116a and the second input port 116b. The signals delivered to the device 100 from either the first 116a or the second 116b input port pass through the PBS 112 and the switchable optical rotator 114 and then into the first birefringent plate 102. The first output port 116c and the second output port 116d are disposed to either side of the input ports 116a and are optically coupled to the first birefringent plate 102.

Figure 5:
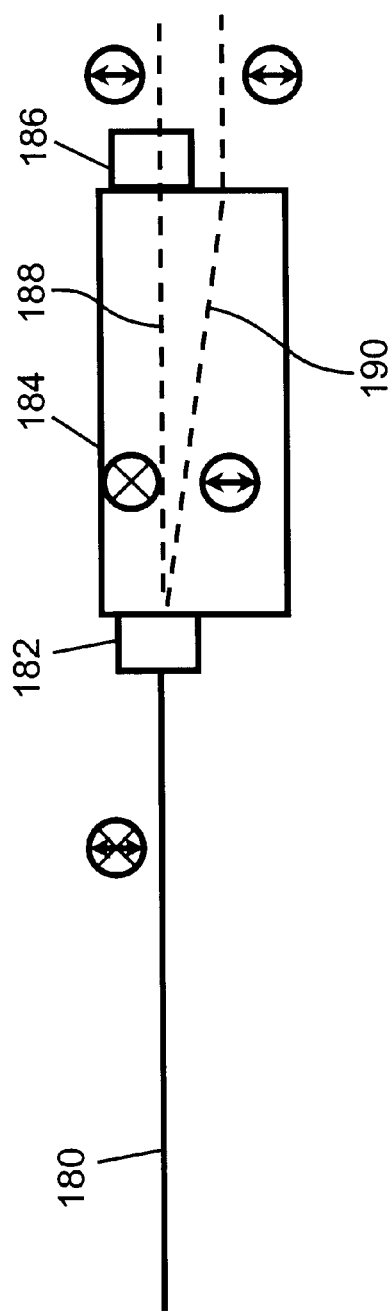
FIG. 5 is a view of a polarizing port assembly utilized within the preferred embodiment of the switchable interleaved channel separator device in accordance with the present invention.

All four ports 116a–116d comprising the switchable interleaved channel separator device 100 are polarizing ports of the type illustrated in FIG. 5. The first input port 116a, PBS 112, switchable optical rotator 114, first birefringent plate 102, second birefringent plate 104, non-reciprocal rotator 106, reciprocal rotator 108 and non-linear interferometer 110 are disposed along a line which defines a main axis or dimension of the switchable interleaved channel separator device 100. The second input port 116b is at an angle to this axis, as shown in FIGS. 2b and 3b.

Also shown in FIGS. 2a–3d, as well as in several following figures, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

The two birefringent plates 102–104 (FIGS. 2a–2d, 3a–3d) each have the property of transmitting signal light comprising a first polarization (o-ray) therethrough substantially parallel to the main axis whilst simultaneously causing a deflection or offset of a signal light comprising a second polarization (e-ray). The path of the e-ray is deflected within either birefringent plate 102–104 but is substantially parallel to (thereby offset from) that of the o-ray immediately upon exiting the plate. The optical axes of the two birefringent plates 102–104 are disposed such that, for e-rays passing through both such birefringent plates 102–104 in a same direction, the offset of the e-ray immediately caused by passage through the second such birefringent plate 104 is equal and opposite to the offset of the e-ray immediately caused by the passage through the first birefringent plate 102. As oriented in FIGS. 2a–2d and 3a–3d, the e-rays and o-rays are polarized vertically and horizontally, respectively, during their traverses through the birefringent plates 102–104.

The polarizing port 116 (FIG. 5) comprises an optical fiber 180, an optical collimator 182, a birefringent walk-off plate 184 and a reciprocal optical rotator 186. The optical collimator 182 is optically coupled to the optical fiber 180 and either receives input from or directs output to the fiber 180. The birefringent walk-off plate 184 of the polarizing port 116 (FIG. 5) is optically coupled to the collimator 182 at a side opposite to the fiber 180 and has the property of physically separating an unpolarized light beam received from collimator 182 into a deflected light beam 190 and an un-deflected light beam 188. The deflected light 190 comprises an e-ray having a first linear polarization orientation and the un-deflected light 188 comprises an o-ray having a second linear polarization orientation perpendicular to that of the e-ray. The reciprocal optical rotator 186, which is optically coupled to the birefringent walk-off plate 184 at a side opposite to the collimator 182, is disposed so at to intercept the path of only one of the two beams 188–190. The reciprocal optical rotator 186 rotates the polarization orientation of the intercepted beam by 90° so as to be parallel to that of the other beam. In the reverse light propagation direction, that is, when the polarizing port 116 is utilized as an output port, the optical rotator 186 rotates the polarization orientation of only one of two beams so that the beams subsequently comprise mutually orthogonal polarization orientations and such that these two beams are subsequently combined upon passage through the birefringent walk-off plate 184. The reciprocal optical rotator 186 may be disposed so as to intercept either the o-ray 188 or the e-ray 190.

Referring once again to FIGS. 2a–2b and FIGS. 3a–3b, the pathways and polarization orientations of forward propagating input signal rays are shown in both top view (top diagram of each figure) and side view (lower diagram of each figure). The complete set of two input beams, as separated by either the first 116a or the second 116b input port, is only visible in the top view of each figure. The light of a first WDM composite optical signal, which is comprised of a plurality of wavelength division multiplexed channels $\lambda_1$–$\lambda_n$, is input to the PBS 112 from the first input port 116a (FIGS. 2a, 3a) such that the two separated input beams both comprise p-polarized light with respect to the PBS 112. Alternatively or simultaneously, the light of a second WDM composite optical signal, which is comprised of a plurality of wavelength division multiplexed channels $\lambda'_1$–$\lambda'_n$, is input to the PBS 112 from the second input port 116b (FIGS. 2b, 3b) such that the two separated input beams both comprise s-polarized light with respect to the PBS 112. The p-polarized channels $\lambda_1$–$\lambda_n$ are transmitted directly through the PBS 112 and the s-polarized channels $\lambda'_1$–$\lambda'_n$ are reflected within the PBS 112 such that these two sets of channels are spatially combined and pass through the switchable optical rotator 114 (FIGS. 2a, 2b, 3a, 3b).

The switchable optical rotator 114 may comprise a liquid crystal rotator, a magneto-optic based Faraday rotator, an acousto-optic or electro-optic rotator, or may comprise some combination of these elements. When the switchable interleaved channel separator device 100 is in its first configuration, state "0" (FIGS. 2a–2b), the spatially overlapping sets of channels $\lambda_1$–$\lambda_n$ and $\lambda'_1$–$\lambda'_n$ pass through the switchable optical rotator 114 and into the first birefringent plate 102 without any change in their respective polarization orientations. Conversely, when the switchable interleaved channel separator device 100 is in its second configuration, state "1" (FIGS. 3a–3b), the switchable optical rotator 114 rotates the polarization plane orientations of the channels $\lambda_1$–$\lambda_n$ and $\lambda'_1$–$\lambda'_n$ by 90°.

When the switchable interleaved channel separator device 100 is in its first configuration, state "0", the horizontally polarized channels $\lambda_1$–$\lambda_n$ comprise undeflected o-rays (FIG. 2a) and the vertically polarized channels $\lambda'_1$–$\lambda'_n$ comprise deflected e-rays (FIG. 2b) within the first birefringent plate 102. When the switchable interleaved channel separator device 100 is in its second configuration, state "1", the polarizations of the channels are rotated by 90° by the switchable optical rotator 114 and thus the $\lambda_1$–$\lambda_n$ channels pass through the birefringent plate 102 as deflected e-rays (FIG. 3a) and the $\lambda'_1$–$\lambda'_n$ channels pass through the birefringent plate 102 as undeflected o-rays.

After emerging from the first birefringent plate 102, channels $\lambda_1$–$\lambda_n$ and $\lambda'_1$–$\lambda'_n$ pass through the non-reciprocal optical rotator 106, the reciprocal optical rotator 108 and the second birefringent plate 104. The elements 106–108 are disposed such that light passing through both from left to right does not experience polarization plane rotation. Thus, the channels $\lambda_1$–$\lambda_n$ and $\lambda'_1$–$\lambda'_n$ respectively propagate through the second birefringent plate 104 as an undeflected o-ray (FIG. 2a) and as a deflected e-ray (FIG. 2b) when the switchable interleaved channel separator 100 is in state "0" and respectively propagate through the birefringent plate 104 as a deflected e-ray (FIG. 3a) and as an undeflected o-ray (FIG. 3b) when the switchable interleaved channel separator device 100 is in state "1". In either switch state, the $\lambda_1$–$\lambda_n$ and $\lambda'_1$–$\lambda'_n$ channels all arrive at the points 115a–115b on the nonlinear interferometer 110.

FIG. 2c illustrates the return pathways of the odd channels $\lambda_1, \lambda_3, \lambda_5, \ldots$ and the identical return pathways of the even channels $\lambda'_2, \lambda'_4, \lambda'_6, \ldots$ through the switchable interleaved channel separator device 100 in the state "0". The term "return pathway" herein refers to the pathway of a channel after its reflection from and interaction with the non-linear interferometer 110. Likewise, FIG. 2d illustrates the return pathways of the even channels $\lambda_2, \lambda_4, \lambda_6, \ldots$ and the identical return pathways of the odd channels $\lambda'_1, \lambda'_3, \lambda'_5, \ldots$ through the switchable interleaved channel separator device 100 in the state "0". FIGS. 3c–3d illustrate return pathways of channels through the device 100 in the state "1", wherein the pathways of the channels are reversed from those in the state "0".

The non-linear interferometer 110 has the property of reflecting all linearly polarized light input thereto such that reflected light comprising a first set of channels (e.g., the "odd" channels) that is interleaved with a second set of channels is reflected without any polarization plane rotation whereas the reflected light comprising the second set of channels (e.g., the "even" channels) is reflected with a 90° polarization plane rotation. Because the non-linear interferometer 110 reflects all light incident upon it, it is also referred to as a "reflection interferometer". The non-linear interferometer 110 is disclosed in a co-pending U.S. patent application entitled "Dense Wavelength Division Multiplexer Utilizing an Asymmetric Pass Band Interferometer.", Ser. No. 09/388,350, filed on Sep. 1, 1999 now U.S. Pat. No. 6,310,690, assigned to the assignee of the present application. Applicant incorporates this application herein by reference in its entirety.

As illustrated in the lower diagram of FIG. 2c, the light of the reflected odd channels, $\lambda_1, \lambda_3, \lambda_5, \ldots$, whose polarization is not rotated by the non-linear interferometer 110, remains horizontally polarized upon re-entering the second birefringent plate 104. Further, the light of the reflected even channels, $\lambda'_2, \lambda'_4, \lambda'_6, \ldots$, whose polarization is rotated by 90° by the non-linear interferometer 110, is also horizontally polarized upon re-entering the second birefringent plate 104. As a result, the light of the channels $\lambda_1, \lambda_3, \lambda_5, \ldots$ and of the channels $\lambda'_2, \lambda'_4, \lambda'_6, \ldots$ comprises o-rays with respect to the second birefringent plate 104 and passes directly through the birefringent plate 104 without deflection towards the reciprocal optical rotator 108 and non-reciprocal optical rotator 106. Contrariwise, as illustrated in the lower diagram of FIG. 2d, the light of the reflected channels $\lambda_2, \lambda_4, \lambda_6, \ldots$, whose polarization plane is rotated by 90° upon reflection from non-linear interferometer 110, and the light of the reflected channels $\lambda'_1, \lambda'_3, \lambda'_5, \ldots$, whose polarization is not rotated upon reflection from non-linear interferometer 110, comprises e-rays with respect to the second birefringent plate 104 and therefore is deflected within the second birefringent plate 104.

During passage from right-to-left through the pair of elements 106–108, the polarization plane orientation of light is rotated by 90°. The light of the channels $\lambda_1, \lambda_3, \lambda_5, \ldots$ and of the channels $\lambda'_2, \lambda'_4, \lambda'_6, \ldots$ thus becomes polarized as e-rays within the first birefringent plate 102 (FIG. 2c). Also, the light of the channels $\lambda'_1, \lambda'_3, \lambda'_5, \ldots$ and of the channels $\lambda_2, \lambda_4, \lambda_6, \ldots$ becomes polarized as o-rays within the first birefringent plate 102 (FIG. 2d). The first birefringent plate 102 therefore deflects the light comprising the channels $\lambda_1, \lambda_3, \lambda_5, \ldots$ and $\lambda'_2, \lambda'_4, \lambda'_6, \ldots$ (FIG. 2c) but allows the light comprising the channels $\lambda'_1, \lambda'_3, \lambda'_5, \ldots$ and $\lambda_2, \lambda_4, \lambda_6, \ldots$ (FIG. 2d) to pass directly therethrough without deflection.

The optic axes of the two birefringent plates 102–104 are symmetrically oriented with respect to one another about a vertical plane perpendicular to the axis of device 100. Because of this disposition of the two optic axes, the offsets of channels polarized as e-rays in birefringent plate 102 and of channels polarized as e-rays in birefringent plate 104 are opposite to one another as illustrated in FIG. 2c and FIG. 2d.

Subsequent to passing through the birefringent plate 102 in the return direction, the channels $\lambda_1, \lambda_3, \lambda_5, \ldots$ and $\lambda'_2, \lambda'_4, \lambda'_6, \ldots$ are directed to the first output port 116c (FIG. 2c) and the channels $\lambda'_1, \lambda'_3, \lambda'_5, \ldots$ and $\lambda_2, \lambda_4, \lambda_6, \ldots$ are directed to the second output port 116d (FIG. 2d). As described previously, the two physically separate beams comprising each channel are recombined by each respective output port and focused into the respective fiber of the port. The first input port 116c (second input port 116d) is disposed so as to only receive vertically (horizontally) polarized light and thus receives the vertically (horizontally) polarized light of the channels $\lambda_1, \lambda_3, \lambda_5, \ldots$ and $\lambda'_2, \lambda'_4, \lambda'_6, \ldots$ (channels $\lambda'_1, \lambda'_3, \lambda'_5, \ldots$ and $\lambda_2, \lambda_4, \lambda_6, \ldots$) upon exit of this light from the birefringent plate 102. In this fashion the device 100 behaves as a wavelength division de-multiplexer.

When the switchable interleaved channel separator device 100 is in its second configuration, state "1", the switchable optical rotator 114 rotates the polarizations of all channels by 90° relative to their orientations when the device is in its first configuration. Therefore, the channels $\lambda_1, \lambda_3, \lambda_5, \ldots$ and $\lambda'_2, \lambda'_4, \lambda'_6, \ldots$ are polarized as e-rays and the channels $\lambda'_1, \lambda'_3, \lambda'_5, \ldots$ and $\lambda_2, \lambda_4, \lambda_6, \ldots$ are polarized as o-rays after reflection from the non-linear interferometer 110 and upon re-entry into the second birefringent plate 104. As a result, when the switchable interleaved channel separator device 100 is in the state "1", the channels $\lambda_1, \lambda_3, \lambda_5, \ldots$ and $\lambda'_2, \lambda'_4, \lambda'_6, \ldots$ are directed to the second output port 116d (FIG. 3d) whilst the channels $\lambda'_1, \lambda'_3, \lambda'_5, \ldots$ and $\lambda_2, \lambda_4, \lambda_6, \ldots$ are directed to the first output port 116c (FIG. 3c). In all other aspects, the operation of the switchable interleaved channel device 100 in the state "1" is similar to its operation in state "0" as previously described.

Figure 4A:
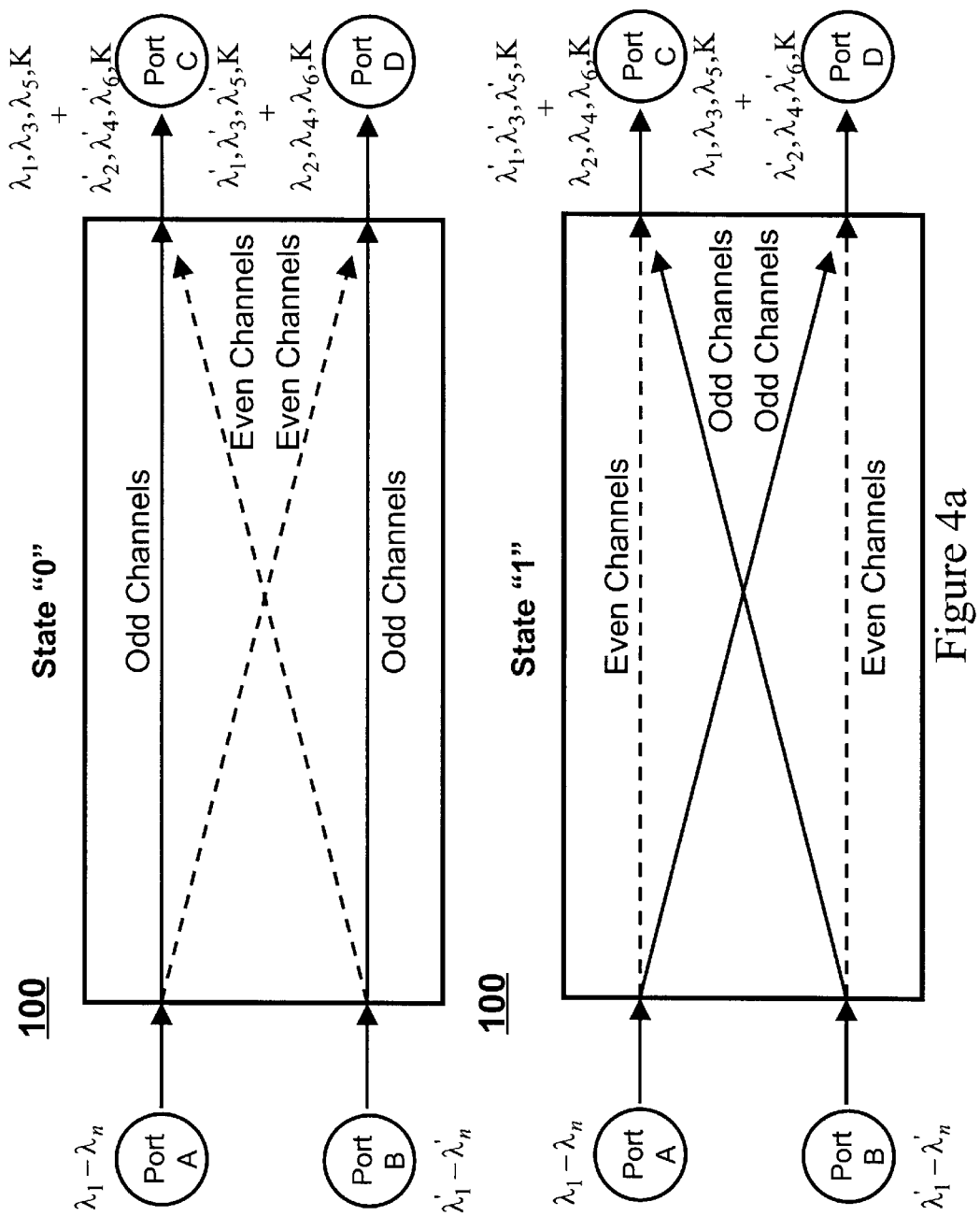
FIGS. 4a–4b are functional signal routing diagrams of the preferred embodiment of the switchable interleaved channel separator device in accordance with the present invention.
Figure 4B:
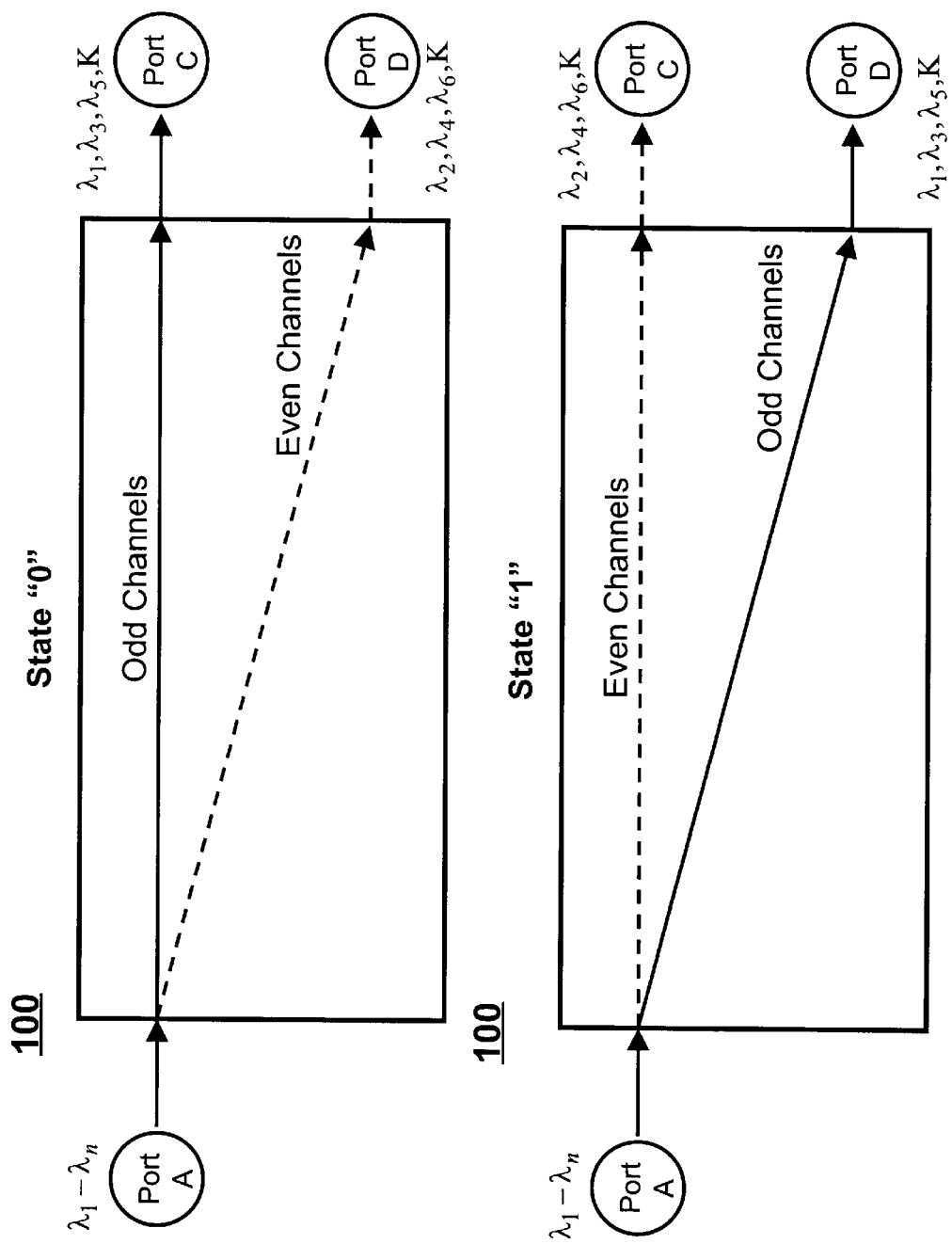

FIGS. 4a–4b are functional signal routing diagrams of the preferred embodiment of the switchable interleaved channel separator device in accordance with the present invention. FIG. 4a illustrates operation of the device as a 2×2 optical switch, and FIG. 4b illustrates operation of the device as a 1×2 switch. The switchable interleaved channel separator device 100 can be operated in either a first operational configuration, state "0" or in a second operational configuration, state "1", as shown in the upper and lower diagrams, respectively, of either FIG. 4a or FIG. 4b. The terms "Port A", Port "B", Port "C" and Port "D" are designations for general input and output ports whose roles are fulfilled by the ports 116a–16d, respectively, within the device 100 (FIGS. 2a–3d). In the state "0", odd-channel signals input to the switchable interleaved channel separator device 100 from Port A and from Port B are directed to Port C and to Port D, respectively, whereas even channel signals input to the switchable interleaved channel separator device 100 from Port A and from Port B are directed to Port D and to Port C, respectively. For instance, as shown in the upper diagram of FIG. 4a, in the state "0" the output at Port C consists of the odd channels ($\lambda_1, \lambda_3, \lambda_5, \ldots$) from the first composite optical signal $\lambda_1-\lambda_n$ input at Port A plus the even channels ($\lambda'_2, \lambda'_4, \lambda'_6, \ldots$) from the second composite optical signal $\lambda'_1-\lambda'_n$ input at Port B. Further, in the state "0", the output at Port D consists of the odd channels ($\lambda'_1, \lambda'_3, \lambda'_5, \ldots$) from the second composite optical signal plus the even channels ($\lambda_2, \lambda_4, \lambda_6, \ldots$) from the first composite optical signal. In the state "1", the pathways of the odd channels and the even channels are reversed from those in the state "0" as shown in the lower diagram of FIG. 4a. In this way, the device 100 functions as a dense wavelength division multiplexer and de-multiplexer that discriminates amongst the pathways of odd and even channels and also functions as a 2×2 switch. If the input Port B is either not present or is not utilized (i.e., no signals are input at Port B), then the device 100 may be considered to operate as a 1×2 switch as schematically illustrated in FIG. 4b.

FIGS. 6a and 6b illustrate the pathways of inadvertently reflected signal light rays through the preferred embodiment of the switchable interleaved channel separator device in accordance with the present invention. Regardless of the channel identity or the switch configuration of the device 100, such backward propagating light is polarized vertically upon being output from the first output port 116c (FIG. 6a) or horizontally upon being output from the second output port 116d (FIG. 6b). The backward propagating light emitted or reflected from port 116c and 116d subsequently passes through the first birefringent plate as a deflected e-ray (FIG. 6a) or as an undeflected o-ray (FIG. 6b), respectively, and passes through the non-reciprocal optical rotator 106, the reciprocal optical rotator 108 and the second birefringent plate 104 in this order. Upon passing through the rotators 106–108 from left to right, the backward propagating light does not incur polarization rotation and thus remains vertically polarized (FIG. 6a) and horizontally polarized (FIG. 6b). Thus, the backward propagating light originating from the first output port 116c and from the second output port 116d remains polarized as a deflected e-ray and as an undeflected o-ray, respectively, within the second birefringent plate 104. Because of the disposition of the optic axes of the two birefringent plates 102–104, there is no net offset of either light upon passing completely through the birefringent plate 102, the non-reciprocal optical rotator 106, the reciprocal optical rotator 108 and the second birefringent plate 104 in this order (FIGS. 6a–6b). The inadvertently reflected or backward propagating light is thus prevented from being directed to either of the input ports 116a–116b. In this fashion, the switchable interleaved channel separator device 100 also performs the function of an optical isolator.

Figure 7:
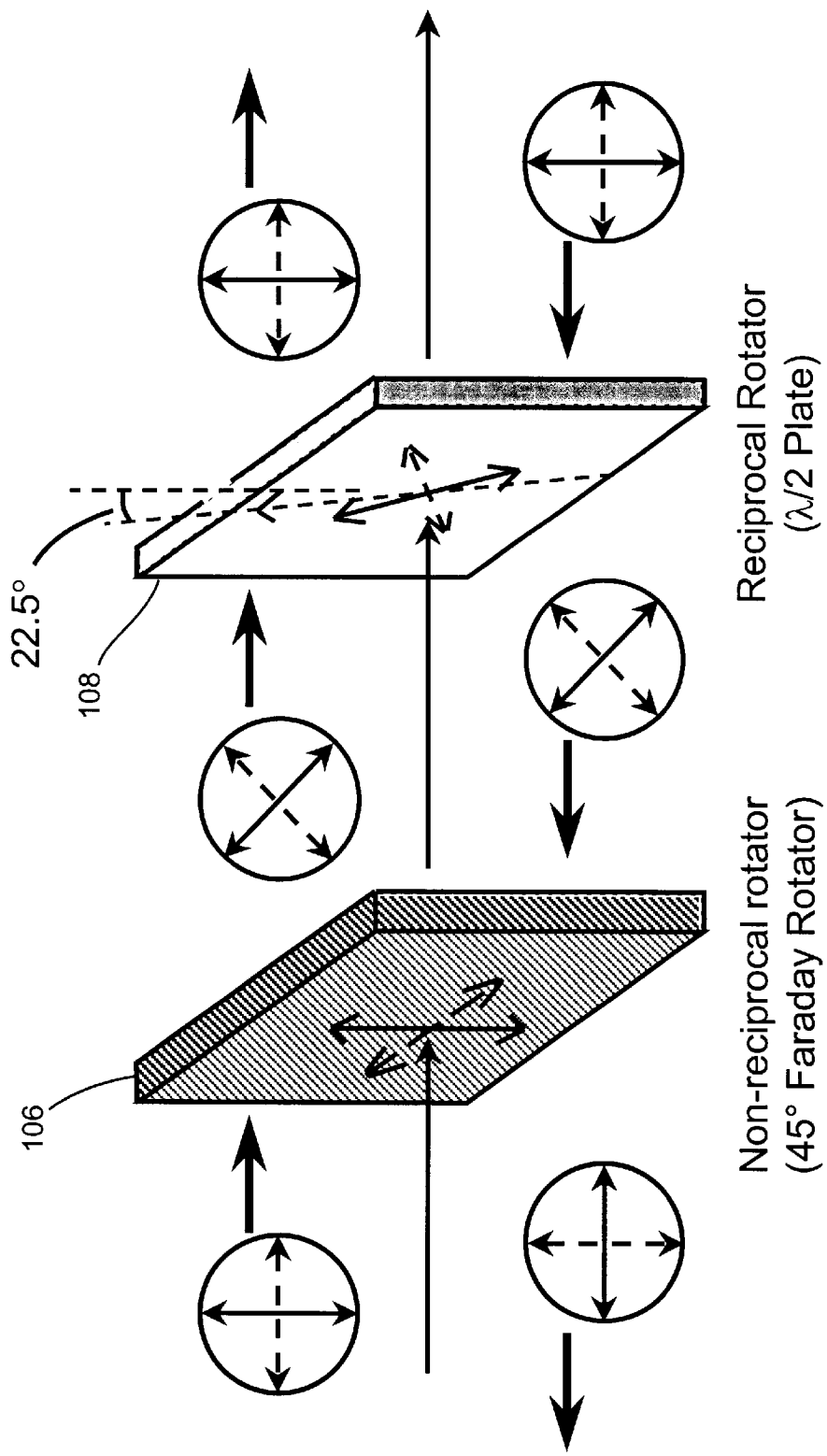
FIG. 7 is a diagram of light polarization rotation upon propagation through a non-reciprocal optical rotator together with a reciprocal optical rotator as utilized within the preferred embodiment of the switchable interleaved channel separator in accordance with the present invention.

FIG. 7 provides a detailed perspective illustration of light polarization rotation upon propagation through a non-reciprocal optical rotator together with a reciprocal optical rotator as utilized within the preferred embodiment of the switchable interleaved channel separator device in accordance with the present invention. In particular, FIG. 7 illustrates one possible configuration in which the non-reciprocal optical rotator 106 comprises a Faraday rotator that rotates the polarization plane of linearly polarized light by 45° counter clockwise (as viewed from the left side of the device) and the reciprocal optical rotator 108 comprises a half-wave plate with its optical axis disposed at 22.5° to the vertical. Other configurations are also possible and the invention is not meant to be limited to the particular disposition of these two components shown in FIG. 7.

The 45 degree Faraday rotator (FIG. 7), which is well-known in the art, is typically comprised of a ferrimagnetic oxide crystal such as yttrium iron garnet (YIG) or else of a diamagnetic glass with a high lead oxide content, or a paramagnetic glass or cubic crystal containing various ions such as trivalent cerium or terbium. The optical rotation of the Faraday rotator typically occurs in response to an externally applied axial magnetic field provided by adjacent or embedded magnets. In FIG. 7, double-barbed arrows inscribed within circles represent the orientations of linearly polarized light as viewed from the left side of the pair of components. Two possible polarization orientations are shown inscribed within each circle, wherein one such polarization orientation is indicated by a dashed arrow for ease of reference. The non-reciprocal optical rotator 106 always rotates the polarization plane of light passing therethrough in either direction by 45° counter clockwise (as viewed from the left side of the apparatus) and, for the illustrated polarization orientations, the reciprocal optical rotator 108 always rotates the polarization plane of light passing therethrough by 45° clockwise (as viewed from the side at which the light enters the rotator 108). By tracing the polarization orientations in either direction through the two optical rotators, it can be seen that the net polarization plane rotation is zero for light propagating from left to right and is 90° for light propagating from right to left.

Figure 8:
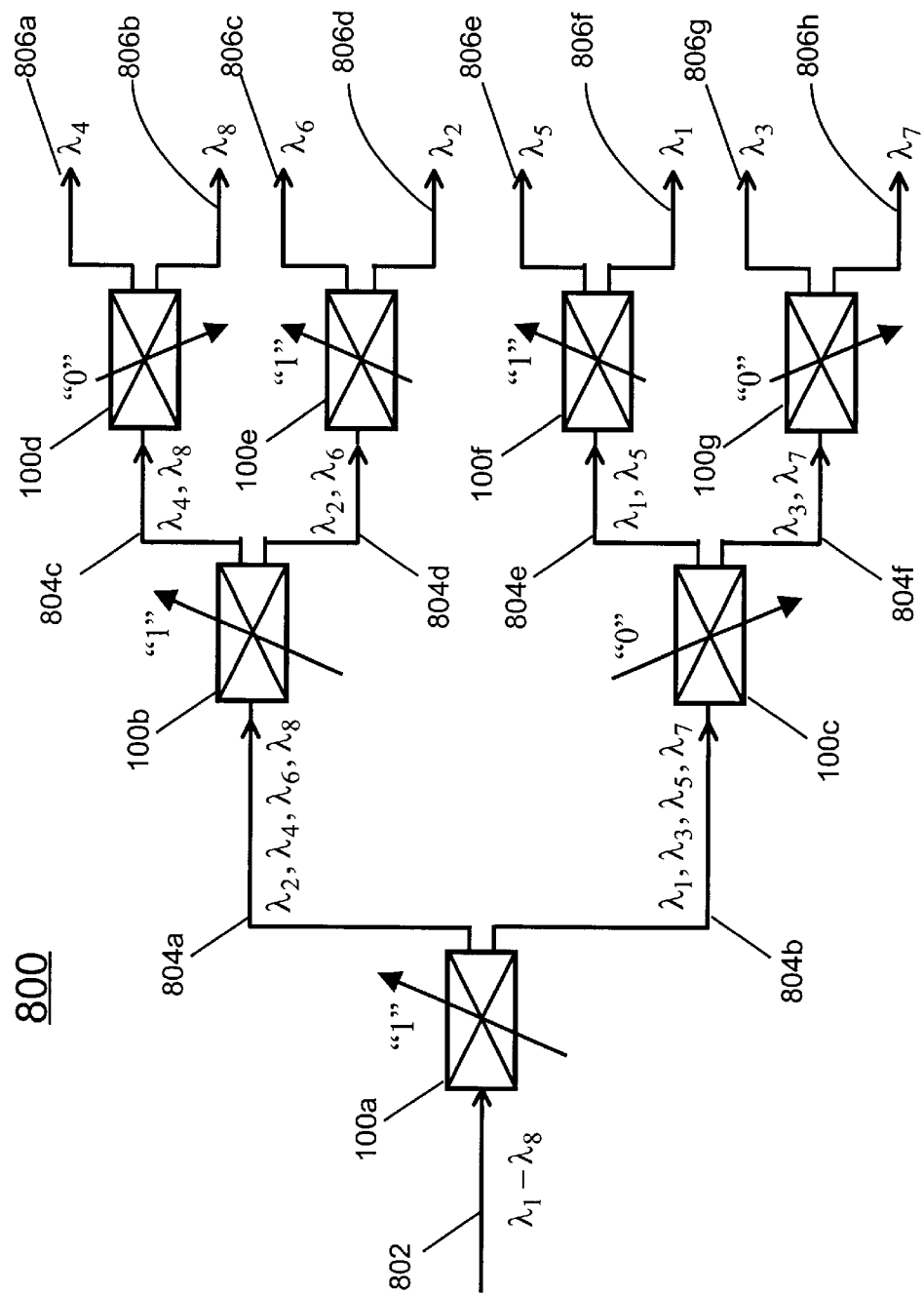
FIG. 8 is a schematic illustration of a first optical communications system that utilizes a plurality of the switchable interleaved channel separator device in accordance with the present invention.

FIG. 8 illustrates a first optical communications system that utilizes a plurality of switchable interleaved channel separator devices in accordance with the present invention. This dense wavelength division multiplexed (DWDM) system 800 comprises a plurality of switchable interleaved channel separator devices 100a, 100b, 100c, . . . , each of which functions as a 1×2 switch as illustrated in FIG. 4b. The system 800 has a programmable parallel cascade router configuration, since each of the switchable interleaved channel separator devices 100a–100g may be programmed to route particular channels to particular paths. This programmable parallel cascade router configuration is disclosed in a co-pending U.S. patent application entitled "Fiber Optic Wavelength Division Multiplexer Utilizing a Multi-Stage Parallel Cascade Method of Wavelength Separation," Ser. No. 09/130,386 filed on Aug. 6, 1998, now U.S. Pat. No. 6,236,126. Applicant incorporates this patent application herein by reference in its entirety.

The DWDM 800 comprises an optical input 802, a plurality of switchable interleaved channel separator devices 100a, 100b, 100c, . . . optically coupled in a parallel cascade configuration by a plurality of optical couplings 804a, 804b, 804c, . . . , and a plurality of optical outputs 806a, 806b, 806c, . . . , wherein the input 802 carries a wavelength division multiplexed composite optical signal and each output carries an individual signal or channel. Generally the optical input, the optical outputs and the optical couplings will all comprise optical fibers, but may comprise, in whole or in part, any form of optical coupling devices, such as lenses, mirrors, prisms, windows, etc. For clarity, it is assumed that the input composite optical signal to the DWDM 800 comprises the eight channels $\lambda_1$–$\lambda_8$ and, thus, the eight optical outputs 806a–806h, the seven switchable interleaved channel separator devices 100a–100g and the six optical couplings 804a–804f are utilized. However, the input composite optical signal to the DWDM 800 may comprise any number of channels and the number of switchable interleaved channel separator devices, optical outputs, and optical couplings may vary accordingly.

The switchable interleaved channel separator devices 100a–100g of the DWDM 800 are arranged in a parallel cascade configuration such that: (1) the two outputs of the device 100a are optically coupled to the device 100b and the device 100c via the optical couplings 804a and 804b, respectively; (2) the two outputs of the device 100b are optically coupled to the device 100d and the device 100e via the optical couplings 804c and 804d, respectively; (3) the two outputs of the device 100c are optically coupled to the device 100f and the device 100g via the optical couplings 804e and 804f, respectively and (4) each of the devices 100d–100g is optically coupled to a pair of the optical outputs 806a–806h. The devices 100b–100c comprise a pass band spacing, and therefore a channel separation periodicity, that is twice that of the device 100a. Likewise, the devices 100d–100g comprise a pass band spacing twice that of the devices 100b–100c.

In the example illustrated in FIG. 8, the first switchable interleaved channel separator device 100a is in state "1" (see FIG. 4b) and thus routes the odd channels ($\lambda_1$, $\lambda_3$, $\lambda_5$, $\lambda_7$) to device 100c and the even channels ($\lambda_2$, $\lambda_4$, $\lambda_6$, $\lambda_8$) channels to the device 100b. Device 100b, also in state "1", routes $\lambda_4$ and $\lambda_8$ to device 100d, and routes $\lambda_2$ and $\lambda_6$ to device 100e. However, the device 100c is in state "0" (in this example) and thus routes channels $\lambda_3$ and $\lambda_7$ to device 100g, and routes $\lambda_1$ and $\lambda_5$ to device 100f. Similarly, the devices 100e and 100f are in the state "1" whereas the devices 100d and 100g are in the state "0", resulting in the particular set of outputs to ports 102h–102o as shown in FIG. 8. In the example shown in FIG. 8, there are seven different independent 1×2 devices 100a–100g which may be programmed independently of one another. There are therefore $2^7(=128)$ different possible permutations of the output signals among the outputs 806a–806h.

Figure 9:
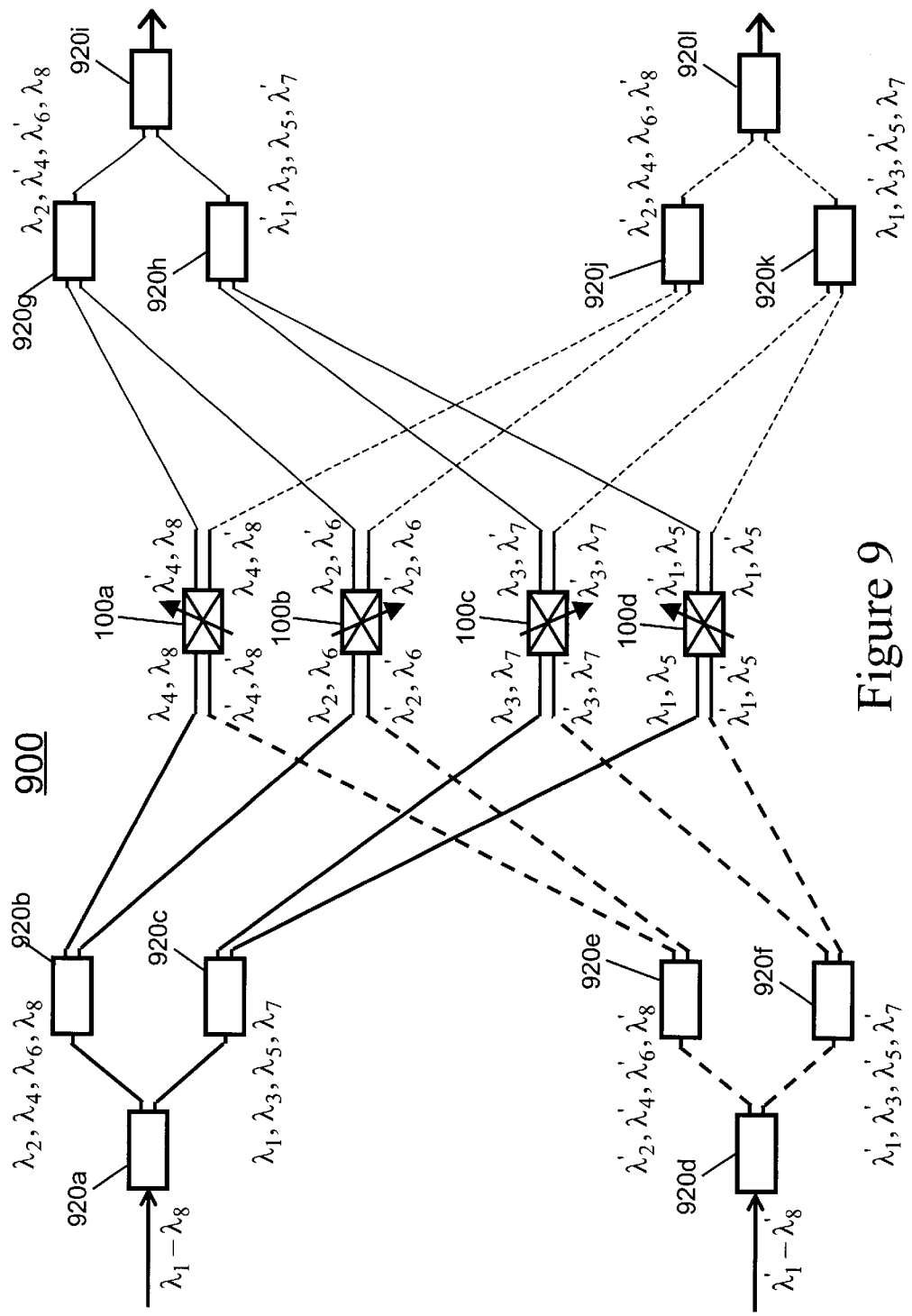
FIG. 9 is a schematic illustration of a second optical communications system that utilizes a plurality of the switchable interleaved channel separator devices in accordance with the present invention.

FIG. 9 illustrates a second optical communications system that utilizes a plurality of switchable interleaved channel separator devices in accordance with the present invention. The system 900 (FIG. 9) comprises a plurality of switchable interleaved channel separator devices 100a, 100b, 100c, . . . each of which functions as a 2×2 switch as illustrated in FIG. 4a. In the example illustrated in FIG. 9, a first wavelength division multiplexed composite optical signal comprising the channels $\lambda_1$–$\lambda_8$ is input to the set of channel separators 920a–920c and a second wavelength division multiplexed composite optical signal comprising the channels $\lambda'_1$–$\lambda'_8$ is input to the set of channel separators 920d–920f. The set of channel separators 920a–920c and the set of channel separators 920d–920f are each configured in a parallel cascade arrangement as disclosed in the aforementioned co-pending U.S. patent application having Ser. No. 09/130,386 (which is now U.S. Pat. No. 6,263,126) . Therefore, the two outputs of the channel separator 920b comprise the set of channels ($\lambda_4$, $\lambda_8$) and the set of channels ($\lambda_2$, $\lambda_6$), respectively. The two outputs of the channel separator 920c comprise the set of channels ($\lambda_3$, $\lambda_7$) and the set of channels ($\lambda_1$, $\lambda_5$), respectively. Likewise, the two outputs of the channel separator 920e comprise the set of channels ($\lambda'_4$, $\lambda'_8$) and the set of channels ($\lambda'_2$, $\lambda'_6$), respectively and the two outputs of the channel separator 920f comprise the set of channels ($\lambda'_3$–$\lambda'_7$) and the set of channels ($\lambda'_1$, $\lambda'_5$), respectively.

Within the system 900 (FIG. 9), the "4" and "8" channels, that is, the set of channels ($\lambda_4$, $\lambda_8$) and the set of channels ($\lambda'_4$, $\lambda'_8$), are input to the 2×2 switchable interleaved channel separator device 100a. Likewise, the "2" and "6" channels from each original composite optical signal are input to the 2×2 switchable interleaved channel separator device 100b, the "3" and "7" channels are input to the 2×2 switchable interleaved channel separator device 100c and the "1" and "5" channels are input to the 2×2 switchable interleaved channel separator device 100d. Each of the 2×2 switchable interleaved channel separator devices 100a–100d may be in one of two different switch states, "0" or "1". One output of each of the devices 100a–100d is directed to the set of channel separators 920g–920i and the other output of each of the devices 100a–100d is directed to the set of channel separators 920j–920l. The switch state of each of the devices 100a–100d determines the particular routings of the wavelengths to the outputs, as described previously with reference to FIG. 4a. The set of channel separators 920g–920i and the set of channel separators 920j–920l are each configured in a parallel cascade arrangement so as to re-combine the various channels. For the particular set of switch states illustrated in FIG. 9, the channels $\lambda'_1$, $\lambda_2$, $\lambda_3$, $\lambda'_4$, $\lambda_5$, $\lambda'_6$, $\lambda'_7$ and $\lambda_8$ are routed to as to be output from system 900 via the channel separator 920i and the channels $\lambda_1$, $\lambda'_2$, $\lambda'_3$, $\lambda_4$, $\lambda'_5$, $\lambda_6$, $\lambda_7$ and $\lambda'_8$ are routed so as to be output via channel separator 920l. For the example shown in FIG. 9, there are a total of sixteen different unique routing configurations of the system 900.

Figure 10A:
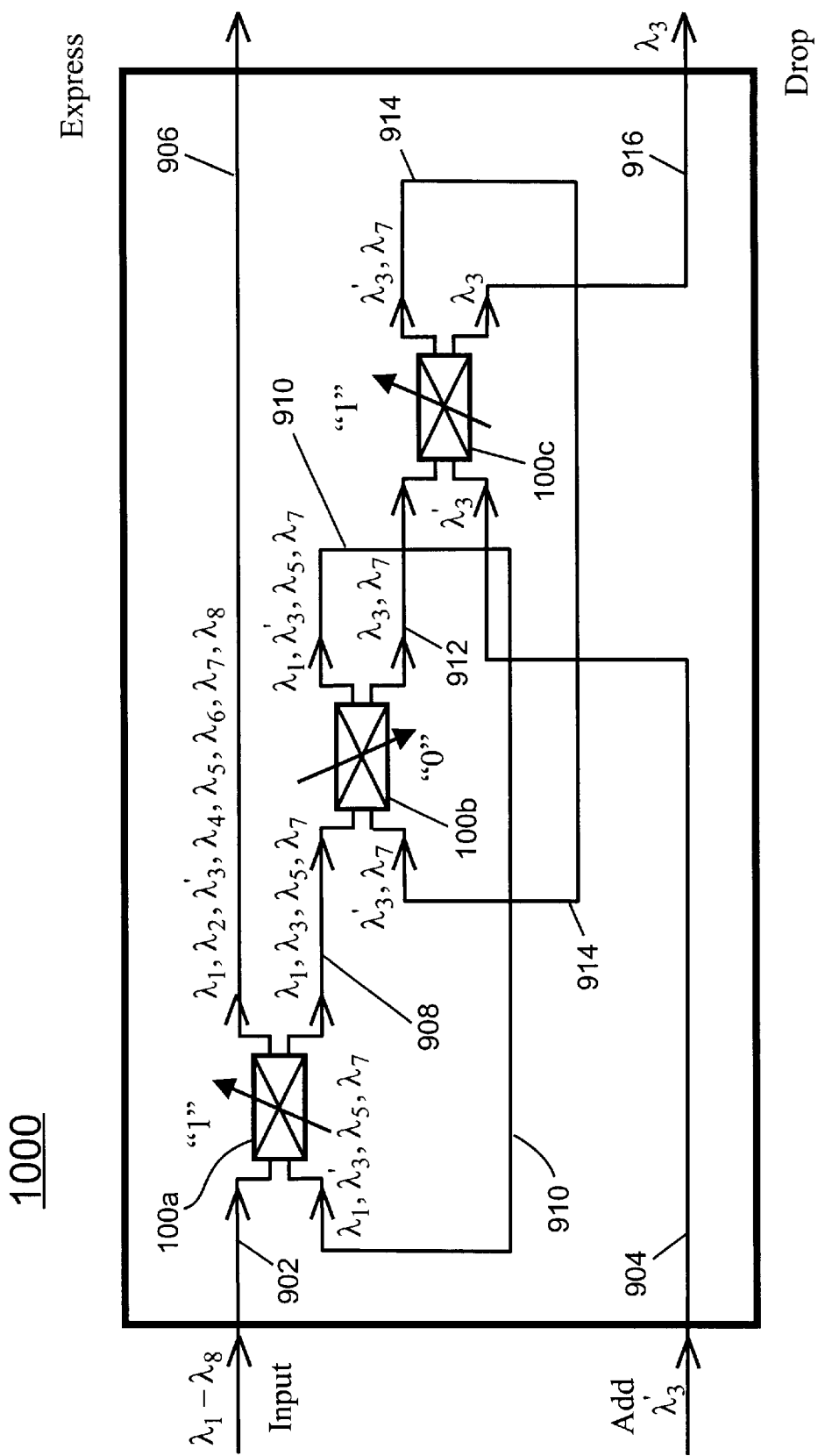
FIGS. 10a–10c are schematic illustrations of a programmable optical add/drop multiplexer that utilizes a plurality of the switchable interleaved channel separator devices in accordance with the present invention.
Figure 10B:
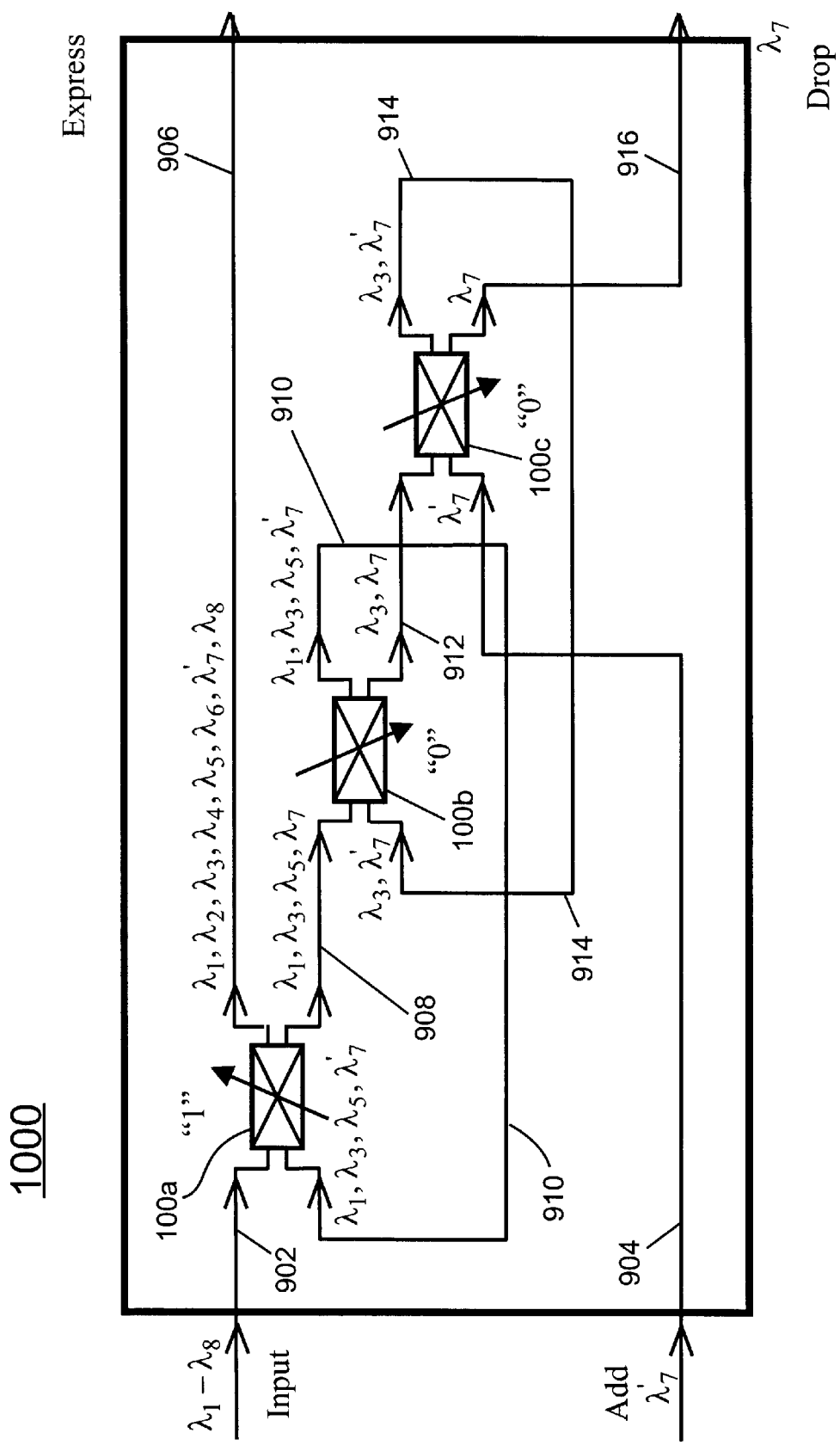
Figure 10C:
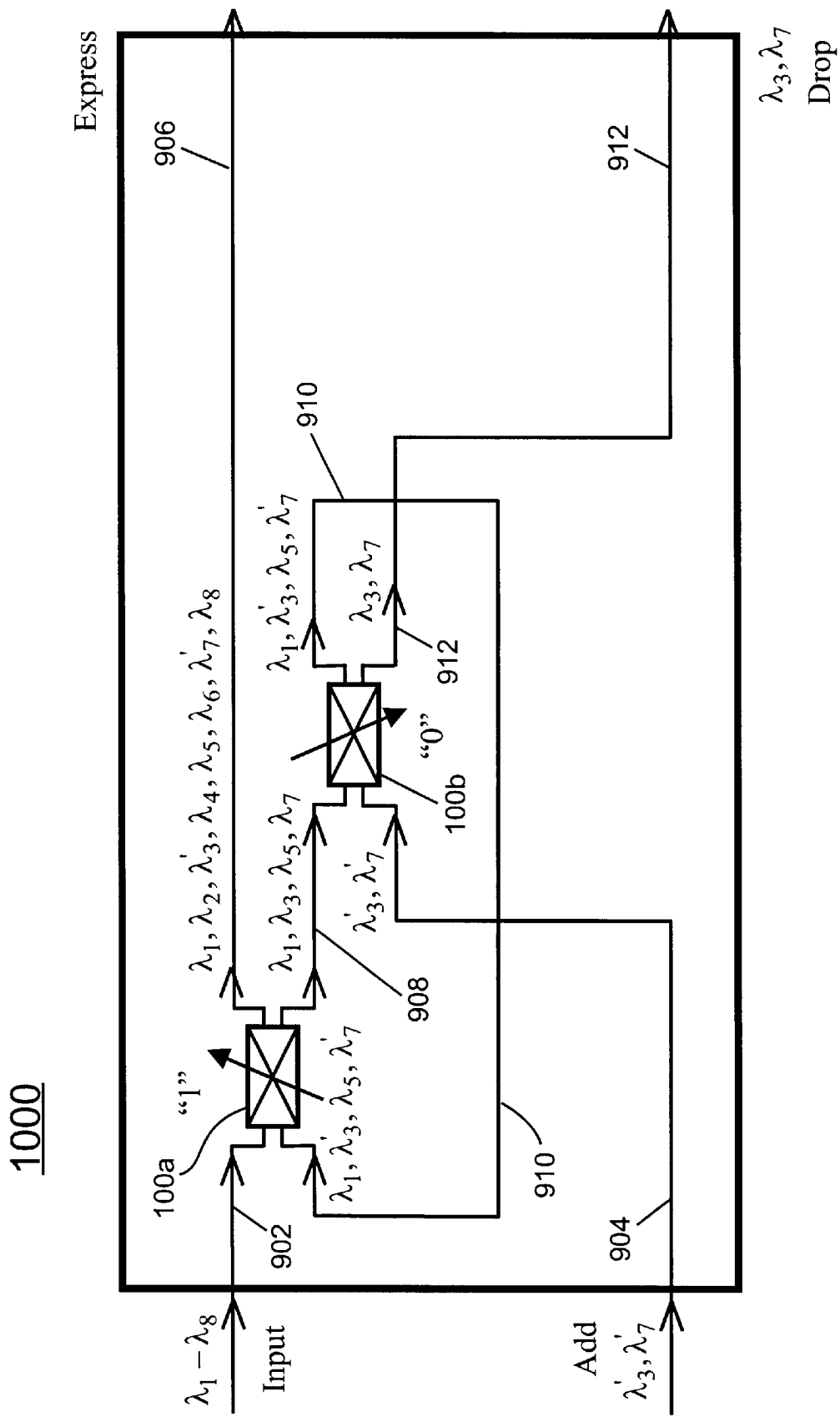

FIGS. 10a–10c illustrate a programmable optical add/drop multiplexer (OADM) that utilizes a plurality of switchable interleaved channel separator devices in accordance with the present invention. The OADM 1000 (FIGS. 10a–10c) comprises a plurality of switchable interleaved channel separator devices 100a–100c each of which functions as a 2×2 switch as illustrated in FIG. 4a. The switchable interleaved channel separator 100b comprises a pass band spacing and therefore a channel separation periodicity twice that of the device 100a. Likewise, the device 100c comprises a pass band spacing twice that of the device 10b. FIGS. 10a–10b illustrate two different operational examples or states of the OADM 1000 wherein the OADM 1000 comprises three such switchable interleaved channel separator devices 100a–100c. FIG. 10c illustrates an example wherein the apparatus 1000 comprises two switchable interleaved channel separator devices 100a–100b. In each of the three operational examples shown in FIGS. 10a–10c, it is assumed that a composite optical signal comprising channels $\lambda_1$–$\lambda_8$ is input into the OADM 1000 via an optical input 902.

Referring now to the example shown in FIG. 10a, the first switchable interleaved channel separator device 100a separates the input composite optical signal into its odd ($\lambda_1$, $\lambda_3$, $\lambda_5$, $\lambda_7$) and even ($\lambda_2$, $\lambda_4$, $\lambda_6$, $\lambda_8$) channels. Since the device 100a is in a state "1" (in this example), the odd channels are directed, via optical coupling 908, to the device 100b, which further separates them into two sets of channels, ($\lambda_1$, $\lambda_5$) and ($\lambda_3$, $\lambda_7$) Since the device 100b is in a state "0", the ($\lambda_3$, $\lambda_7$) set of channels is directed, via the optical coupling 912, to the device 100c which separates them into the separate channels $\lambda_3$ and $\lambda_7$. Since the device 100c is in a state "1", the channel $\lambda_3$ is then dropped to the drop line 916. Since the channel $\lambda_3$ is dropped, a new signal $\lambda'_3$ comprising the same wavelength as $\lambda_3$ may be simultaneously added as an input into the device 100c from the add line 904. Since the device 100c acts as a 2×2 switch and is in the state "1" as described previously, channel $\lambda'_3$ is then added to $\lambda_7$ by the device 100c. This signal is looped back, via optical coupling 914, as an input to the device 100b, which, since it is in state "0", adds $\lambda_7$ and $\lambda'_3$ to $\lambda_1$ and $\lambda_5$. This combined signal is looped back, via optical coupling 910, as an input to the device 100a, which, since it is in state "1", adds channels $\lambda_1$, $\lambda_5$, $\lambda_7$, $\lambda'_3$ to channels $\lambda_2$, $\lambda_4$, $\lambda_6$, $\lambda_8$, resulting in one optical signal containing channels $\lambda_1$, $\lambda_2$, $\lambda'_3$, $\lambda_4$ $\lambda_5$, $\lambda_6$, $\lambda_7$, and $\lambda_8$. This new signal is then output from the DWDM 1000 along the express line 906. Thus, in this manner, channel $\lambda_3$ is dropped while channel $\lambda'_3$ is added.

FIG. 10b illustrates an additional example of a different operational state of the OADM 1000. Since, in the examples of FIGS. 10a–10b, the OADM 1000 comprises three switchable interleaved channel separator devices 100a–100c, wherein each such device may be in one of two states, there are a total of $2^3(=8)$ possible operational states for the OADM 1000, each of which corresponds to adding and dropping of a different one of the eight possible wavelengths. It is to be noted, however, that the OADM 1000 may comprise any number of switchable interleaved channel separator devices and that the composite optical signal may comprise any number of channels. FIG. 10b illustrates the situation in which the three switchable interleaved channel separator devices 100a–100c are in the states "1", "0" and "0", respectively, and thus channel $\lambda_7$ is dropped and channel $\lambda'_7$ is added. More generally, for $2^n$ channels and m (m≦n) stages, $2^{n-m}$ channels may be dropped. In the further example shown in FIG. 10c, the OADM 1000 comprises two stages (that is, m=2) and thus two channels may be simultaneously dropped and added.

Figure 11:
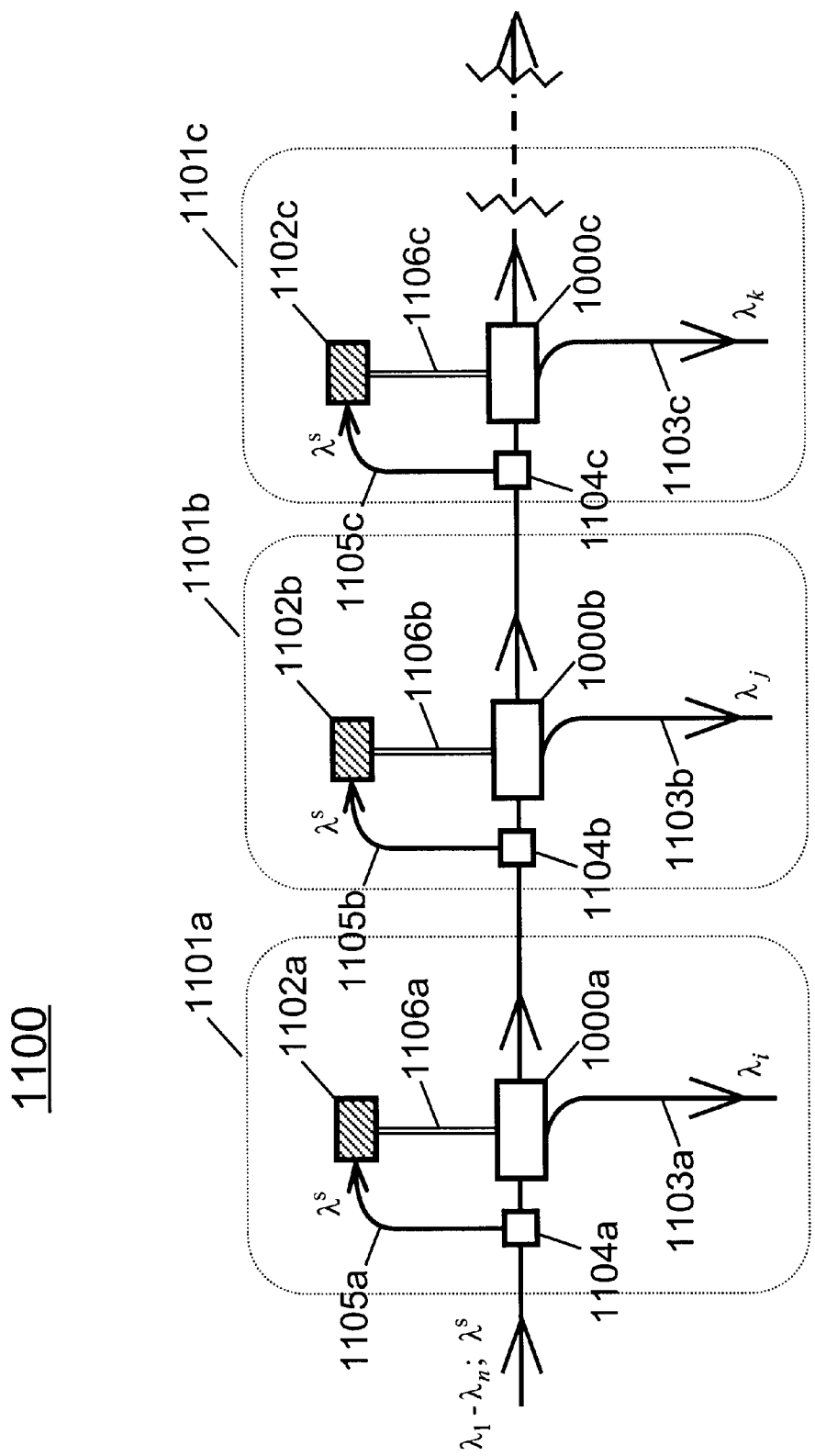
FIG. 11 is a schematic illustration of an optical communications system that utilizes the programmable optical add/drop multiplexer of FIGS. 10a–10c.

FIG. 11 illustrates an optical communications system that utilizes the programmable OADM of FIGS. 10a–10c. This programmable system drops a different channel from a composite optical signal at each one of a series of nodes within an optical network. The nodes are represented by the reference numerals 1101a, 1101b, 1101c, . . . in the programmable system 1100 shown in FIG. 11. Each node comprises one of a plurality of programmable OADM's 1000a, 1000b, 1000c, . . . , one of a plurality of optical drop lines 1103a, 1103b, 1103c, . . . , one of a plurality of optical taps 1104a, 1104b, 1104c, . . . , one of a plurality of optical tap lines 1105a, 11105b, 1105c, . . . , one of a plurality of controllers 1102a, 1102b, 1102c, . . . , and one of a plurality of electronic control lines 1106a, 1106b, 1106c, Within each node 1101a, 1101b, 1101c, . . . , comprising the system 1100, an optical tap line 11105a, 1105b, 1105c, . . . is optically coupled between an optical tap 1104a, 1104b, 1104c, . . . and a controller 1102a, 1102b, 1102c, . . . ; a programmable OADM 1000a, 1000b, 1000c, . . . is optically coupled to an optical drop line 1103a, 1103b, 1103c, . . . and to an optical tap 1104a, 1104b, 1104c, . . . and to at least one other node 1101a, 1101b, 1101c, . . . , and an electronic control line 1106a, 1106b, 1106c, . . . is electronically coupled between a controller 1102a, 1102b, 1102c, . . . and an OADM 1000a, 1000b, 1000c, . . . . Preferably, each one of the programmable OADM's 1000a, 1000b, 1000c, . . . comprises the structure shown in FIGS. 10a–10b.

The first node 1101a in the programmable system 1100 receives a composite optical signal comprising the channels $\lambda_1$–$\lambda_n$ as well as an optical service channel $\lambda^s$ from the optical network. The optical service channel $\lambda^s$ comprises a wavelength that is different from those of any of the regular channels and carries information related to the routing of various channels within the programmable system 1100. This information is utilized and decoded by each of the controllers 1102a, 1102b, 1102c, . . . so that the appropriate channel is dropped to the drop line 1103a, 1103b, 1103c, . . . at each node 1101a, 1101b, 1101c, . . . . Within each node 1101a, 1101b, 110c, . . . , the controller 1102a, 1102b, 1102c, . . . sends appropriate control signals to the programmable OADM 1000a, 1000b, 1000c, . . . through the electronic control line 1106a, 1106b, 1106c, . The control signals cause the set of switchable interleaved channel separator devices comprising the programmable OADM 1000a, 1000b, 1000c, . . . to assume the appropriate switch states such that the correct wavelength channel is dropped at the node. In this system, no signals are added at the nodes. Therefore, upon exiting from each node, the composite optical signal that propagates to the subsequent node comprises one less channel than that entering the node.

An improved switchable interleaved channel separator device has been disclosed. The switchable interleaved channel separator device utilizes a reflective non-linear interferometer and one single-segment switchable polarization rotator. The reflective non-linear interferometer causes signal light paths to be reflected back upon one another so as to realize an overall reduction in size. This path reflection also enables the capability of providing optical couplings predominantly or wholly at a single side or at adjacent sides of the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A switchable interleaved channel separator device, comprising:

at least one input port for inputting at least one optical signal in a forward direction;

a polarization beam splitter (PBS) optically coupled to the at least one input port;

a separating means for separating the at least one optical signal traversing through the separating means in a return direction into a first set of channels and a second set of channels interleaved with the first set of channels, wherein the separating means comprises:

a first birefringent plate optically coupled to the PBS, a set of optical rotators optically coupled to the first birefringent plate, the set of optical rotators comprising a non-reciprocal optical rotator (NRR) and a reciprocal optical rotator (RR), a second birefringent plate optically coupled to the set of optical rotators at a side opposite to the first birefringent plate, and an interferometer optically coupled to the second birefringent plate at a side opposite to the set of optical rotators;

a switchable optical rotator (SOR) optically coupled to the PBS and the first birefringent plate, wherein the SOR in a first state does not rotate a polarization of the first or the second set of channels, wherein the SOR in a second state rotates a polarization of the first and the second sets of channels;

a first output port optically coupled to the separating means for outputting the first set of channels when the SOR is in the first state and the second set of channels when the SOR is in the second state; and a second output port optically coupled to the separating means for outputting the second set of channels when the SOR is in the first state and the first set of channels when the SOR is in the second state.

2. The device of claim 1, wherein the at least one input port, the first output port, or the second output port comprises:
- an optical collimator;
- a birefringent walk-off plate optically coupled to the optical collimator; and
- an input reciprocal optical rotator intercepting a portion of a light from the birefringent walk-off plate.

3. The device of claim 1, wherein the NRR is optically coupled to the first birefringent plate, and the RR is optically coupled to the NRR at a side opposite to the first birefringent plate.

4. A system, comprising:
- an optical input; and
- a plurality of switchable interleaved channel separator devices optically coupled to the optical input, wherein the plurality of switchable interleaved channel separator devices are optically coupled in a parallel cascade configuration, wherein each switchable interleaved channel separator device comprises:
  - at least one input port for inputting at least one optical signal in a forward direction,
  - a PBS optically coupled to the at least one input port,
  - a separating means for separating the at least one optical signal traversing through the separating means in a return direction into a first set of channels and a second set of channels interleaved with the first set of channels, wherein the separating means comprises:
    - a first birefringent plate optically coupled to the PBS,
    - a set of optical rotators optically coupled to the first birefringent plate, the set of optical rotators comprising a NRR and a RR,
    - a second birefringent plate optically coupled to the set of optical rotators at a side opposite to the first birefringent plate, and
    - an interferometer optically coupled to the second birefringent plate at a side opposite to the set of optical rotators,
  - a SOR optically coupled to the PBS and the first birefringent plate, wherein the SOR in a first state does not rotate a polarization of the first or second set of channels, wherein the SOR in a second state rotates a polarization of the first and second sets of channels,
  - a first output port optically coupled to the separating means for outputting the first set of channels when the SOR is in the first state and the second set of channels when the SOR is in the second state, and
  - a second output port optically coupled to the separating means for outputting the second set of channels when the SOR is in the first state and the first set of channels when the SOR is in the second state.

5. The system of claim 4, wherein the at least one input port, the first output port, or the second output port comprises:
- an optical collimator;
- a birefringent walk-off plate optically coupled to the optical collimator; and
- an input reciprocal optical rotator intercepting a portion of a light from the birefringent walk-off plate.

6. The system of claim 4, wherein the NRR is optically coupled to the first birefringent plate, and the RR is optically coupled to the NRR at a side opposite to the first birefringent plate.

7. A system, comprising:
- a first plurality of sets of channel separators, wherein each set of the first plurality of sets of channel separators is in a parallel cascade configuration;
- a plurality of switchable interleaved channel separator devices comprising a plurality of input ports and a plurality of output ports, wherein the plurality of input ports is optically coupled to the first plurality of sets of channel separators, wherein each switchable interleaved channel separator device comprises:
  - a first input port for inputting a first set of channels in a forward direction,
  - a second input port for inputting a second set of channels in the forward direction,
  - a PBS optically coupled to the first and second input ports,
  - a separating means for separating the first set of channels traversing through the device in a return direction into a first subset of channels and a second subset of channels interleaved with the first subset of channels, wherein the separating means separates the second set of channels traversing through the device in the return direction into a third subset of channels and a fourth subset of channels interleaved with the third subset of channels, wherein the separating means comprises:
    - a first birefringent plate optically coupled to the PBS,
    - a set of optical rotators optically coupled to the first birefringent plate, the set of optical rotators comprising a NRR and a RR,
    - a second birefringent plate optically coupled to the set of optical rotators at a side opposite to the first birefringent plate, and
    - an interferometer optically coupled to the second birefringent plate at a side opposite to the set of optical rotators,
  - a SOR optically coupled to the PBS and the first birefringent plate, wherein the SOR in a first state does not rotate a polarization of the first, second, third, or fourth subset of channels, wherein the SOR in a second state rotates a polarization of the first, second, third, and fourth subsets of channels,
  - a first output port optically coupled to the separating means for outputting the first and fourth subsets of channels when the SOR is in the first state, wherein the first output port outputs the second and third subsets of channels when the SOR is in the second state, and
  - a second output port optically coupled to the separating means for outputting the second and third subsets of channels when the SOR is in the first state, wherein the second output port outputs the first and fourth subsets of channels when the SOR is in the second state; and
- a second plurality of sets of channel separators optically coupled to the plurality of output ports of the plurality of switchable interleaved channel separator devices, wherein each set of the second plurality of sets of channel separators is in a parallel cascade configuration.

8. The system of claim 7, wherein the first or second input port or the first or second output port comprises:
- an optical collimator;
- a birefringent walk-off plate optically coupled to the optical collimator; and
- an input reciprocal optical rotator intercepting a portion of a light from the birefringent walk-off plate.

9. The system of claim 7, wherein the NRR is optically coupled to the first birefringent plate, and the RR is optically coupled to the NRR at a side opposite to the first birefringent plate.

10. An optical add/drop module (OADM), comprising:
a first switchable interleaved channel separator device, comprising:
a first input port of the first switchable interleaved channel separator device,
a second input port of the first switchable interleaved channel separator device,
a first output port of the first switchable interleaved channel separator device, and
a second output port of the first switchable interleaved channel separator device; and
a second switchable interleaved channel separator device, comprising:
a first input port of the second switchable interleaved channel separator device optically coupled to the second output port of the first switchable interleaved channel separator device,
a second input port of the second switchable interleaved channel separator device,
a first output port of the second switchable interleaved channel separator device optically coupled to the second input port of the first switchable interleaved channel separator device, and
a second output port of the second switchable interleaved channel separator device,
wherein the first and second switchable interleaved channel separator devices each further comprises:
a PBS optically coupled to the first and second input ports of the first or second switchable interleaved channel separator device,
a separating means optically coupled to the first and second input ports of the first or second switchable interleaved channel separator device,
wherein the separating means separates a first optical signal from the first input port of the first or second switchable interleaved channel separator device into a first set of channels and a second set of channels interleaved with the first set of channels, wherein the first optical signal is traversing through the separating means in a return direction,
wherein the separating means separates a second optical signal from the second input port of the first or second switchable interleaved channel separator device into a third set of channels and a fourth set of channels interleaved with the third set of channels, wherein the second optical signal is traversing through the separating means in a return direction,
wherein the separating means comprises:
a first birefringent plate optically coupled to the PBS,
a set of optical rotators optically coupled to the first birefringent plate, the set of optical rotators comprising a NRR and a RR,
a second birefringent plate optically coupled to the set of optical rotators at a side opposite to the first birefringent plate, and
an interferometer optically coupled to the second birefringent plate at a side opposite to the set of optical rotators,
a SOR optically coupled to the PBS and the first birefringent plate, wherein the SOR in a first state does not rotate a polarization of the first, second, third, or fourth set of channels, wherein the SOR in a second state rotates a polarization of the first, second, third, and fourth sets of channels,
wherein when the SOR is in the first state, the first output port of the first or second switchable interleaved channel separator device outputs the first and fourth sets of channels, and the second output port of the first or second switchable interleaved channel separator device outputs the second and third sets of channels,
wherein when the SOR is in the second state, the first output port of the first or second switchable interleaved channel separator device outputs the second and third sets of channels, and the second output port of the first or second switchable interleaved channel separator device outputs the first and fourth sets of channels.

11. The OADM of claim 10, wherein the first or second input ports of the first or second switchable interleaved channel separator device, or the first or second output ports of the first or second switchable interleaved channel separator device, comprises:
an optical collimator;
a birefringent walk-off plate optically coupled to the optical collimator; and
an input reciprocal optical rotator intercepting a portion of a light from the birefringent walk-off plate.

12. The OADM of claim 10, wherein the NRR is optically coupled to the first birefringent plate, and the RR is optically coupled to the NRR at a side opposite to the first birefringent plate.

13. A system, comprising:
an OADM, comprising:
a first switchable interleaved channel separator device, comprising:
a first input port of the first switchable interleaved channel separator device,
a second input port of the first switchable interleaved channel separator device,
a first output port of the first switchable interleaved channel separator device, and
a second output port of the first switchable interleaved channel separator device, and
a second switchable interleaved channel separator device, comprising:
a first input port of the second switchable interleaved channel separator device optically coupled to the second output port of the first switchable interleaved channel separator device,
a second input port of the second switchable interleaved channel separator device,
a first output port of the second switchable interleaved channel separator device optically coupled to the second input port of the first switchable interleaved channel separator device, and
a second output port of the second switchable interleaved channel separator device,
wherein the first and second switchable interleaved channel separator devices each further comprises:
a PBS optically coupled to the first and second input ports of the first or second switchable interleaved channel separator device,
a separating means optically coupled to the first and second input ports of the first or second switchable interleaved channel separator device,
wherein the separating means separates a first optical signal from the first input port of the first or second switchable interleaved channel separator device into a first set of channels and a second set of channels interleaved with the first set of channels, wherein the first optical signal is traversing through the separating means in a return direction, wherein the separating means separates a second optical signal from the second input port of the first or second switchable interleaved channel separator device into a third set of channels and a fourth set of channels interleaved with the third set of channels, wherein the second optical signal is traversing through the separating means in the return direction, wherein the separating means comprises:
- a first birefringent plate optically coupled to the PBS,
- a set of optical rotators optically coupled to the first birefringent plate, the set of optical rotators comprising a NRR and a RR,
- a second birefringent plate optically coupled to the set of optical rotators at a side opposite to the first birefringent plate, and
- an interferometer optically coupled to the second birefringent plate at a side opposite to the set of optical rotators, a SOR optically coupled to the PBS and the first birefringent plate, wherein the SOR in a first state does not rotate a polarization of the first, second, third, or fourth set of channels, wherein the SOR in a second state rotates a polarization of the first, second, third, and fourth sets of channels, wherein when the SOR is in the first state, the first output port of the first or second switchable interleaved channel separator device outputs the first and fourth sets of channels, and the second output port of the first or second switchable interleaved channel separator device outputs the second and third sets of channels, wherein when the SOR is in the second state, the first output port of the first or second switchable interleaved channel separator device outputs the second and third sets of channels, and the second output port of the first or second switchable interleaved channel separator device outputs the first and fourth sets of channels;

a controller electronically coupled to the OADM;

an optical tap optically coupled to the first input port of the first switchable interleaved channel separator device;

an optical tap line coupled to the optical tap and the controller for transmitting an optical service channel; and an add/drop line optically coupled to the an output port of the OADM.

14. The system of claim 13, wherein the first or second input ports of the first or second switchable interleaved channel separator device, or the first or second output ports of the first or second switchable interleaved channel separator device comprises:

an optical collimator;

a birefringent walk-off plate optically coupled to the optical collimator; and an input reciprocal optical rotator intercepting a portion of a light from the birefringent walk-off plate.

15. The system of claim 13, wherein the NRR is optically coupled to the first birefringent plate, and the RR is optically coupled to the NRR at a side opposite to the first birefringent plate.

* * * * *